United States Patent
Graham et al.

(10) Patent No.: US 12,419,461 B2
(45) Date of Patent: Sep. 23, 2025

(54) COOKING SYSTEM INCLUDING WIND GUARD DEVICE AND METHOD THEREOF

(71) Applicant: North Atlantic Imports, LLC, Logan, UT (US)

(72) Inventors: Gary E. Graham, Hyde Park, UT (US); James C. Bush, III, Providence, UT (US); Jared M. Smith, Paradise, UT (US); Alexander J. Christensen, Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 635 days.

(21) Appl. No.: 17/750,628

(22) Filed: May 23, 2022

(65) Prior Publication Data
US 2022/0386813 A1    Dec. 8, 2022

Related U.S. Application Data

(60) Provisional application No. 63/192,485, filed on May 24, 2021.

(51) Int. Cl.
A47J 37/07    (2006.01)

(52) U.S. Cl.
CPC ....... *A47J 37/0786* (2013.01); *A47J 37/0704* (2013.01)

(58) Field of Classification Search
None
See application file for complete search history.

(56) References Cited

U.S. PATENT DOCUMENTS

| | | | |
|---|---|---|---|
| 3,789,821 A * | 2/1974 | Fick | F24C 15/28 |
| | | | 126/38 |
| 4,508,096 A | 4/1985 | Slattery | |
| 4,663,517 A | 5/1987 | Huff et al. | |
| 4,726,349 A * | 2/1988 | Gehrke | A47J 37/0763 |
| | | | 126/25 B |
| 4,838,446 A | 6/1989 | Ali | |
| 5,495,845 A | 3/1996 | Hait | |
| 5,542,347 A | 8/1996 | Joseph | |
| 5,558,008 A | 9/1996 | Jenkins | |
| 5,740,723 A * | 4/1998 | Lin | A47J 37/0682 |
| | | | 99/422 |
| 5,842,463 A | 12/1998 | Hall | |
| 5,979,428 A | 11/1999 | Greene, Jr. | |
| 6,125,838 A | 10/2000 | Hedgpeth | |
| D613,117 S | 4/2010 | Richburg | |
| 8,020,546 B1 | 9/2011 | Bourgeois et al. | |
| 8,757,140 B2 | 6/2014 | Hatjopoulos et al. | |
| 10,995,964 B2 | 5/2021 | Dahle | |

(Continued)

OTHER PUBLICATIONS https://blackstoneproducts.com/products/17-22-adjustable-wind-guard?_pos=2&_sid=6e1a213e8&_ss=r.*

*Primary Examiner* — Ko-Wei Lin
(74) *Attorney, Agent, or Firm* — David L. Stott

(57) ABSTRACT

A cooking system configured to minimize cross-winds while cooking a food product. The cooking system includes a cooking station, a griddle and a wind guard. The wind guard extends to define a barrier portion and an engaging portion, the engaging portion coupled to legs of the griddle so that, upon the griddle being placed onto the cooking station, the barrier portion blocks a gap between the griddle and a top side of the cooking station.

19 Claims, 11 Drawing Sheets

(56) References Cited

U.S. PATENT DOCUMENTS

| | | | |
|---|---|---|---|
| 11,725,831 B2* | 8/2023 | Dahle | F24C 15/28 |
| | | | 126/9 R |
| 2004/0099258 A1* | 5/2004 | Price | F24C 15/28 |
| | | | 126/50 |
| 2005/0115556 A1 | 6/2005 | Carson et al. | |
| 2007/0207429 A1 | 9/2007 | Barker | |
| 2009/0025705 A1* | 1/2009 | Hatjopoulos | A47J 37/0682 |
| | | | 126/214 D |
| 2009/0038605 A1 | 2/2009 | Dahle et al. | |
| 2010/0000983 A1 | 1/2010 | Babington | |
| 2010/0116149 A1 | 5/2010 | Lai | |
| 2018/0220845 A1 | 8/2018 | Dahle | |
| 2019/0128538 A1* | 5/2019 | Dahle | F24C 15/28 |
| 2020/0248910 A1* | 8/2020 | Hawkinson | A47B 13/08 |
| 2021/0244233 A1* | 8/2021 | Bush, III | A47J 37/067 |
| 2022/0240719 A1* | 8/2022 | Shen | A47J 37/0704 |
| 2022/0330751 A1* | 10/2022 | Smith | A47J 37/0763 |

\* cited by examiner

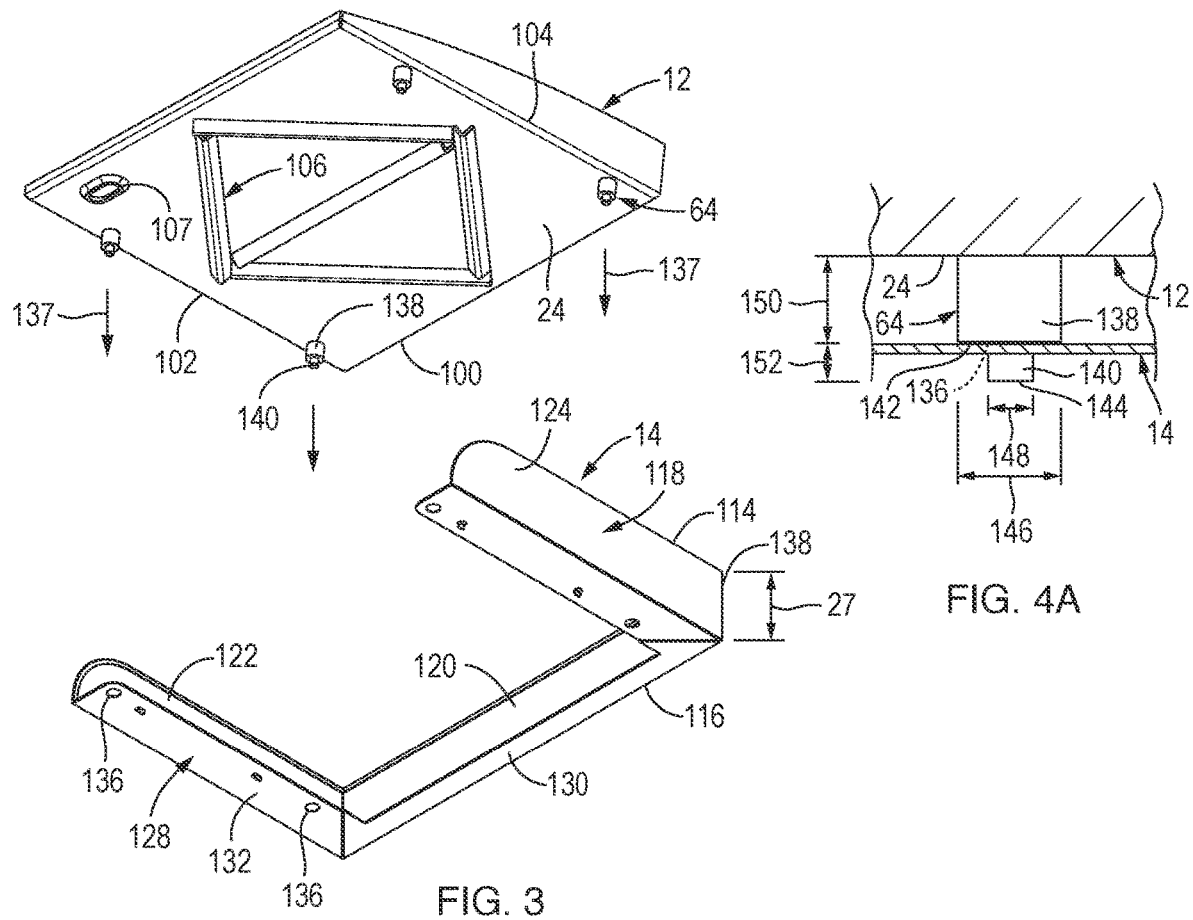
FIG. 3
FIG. 4A
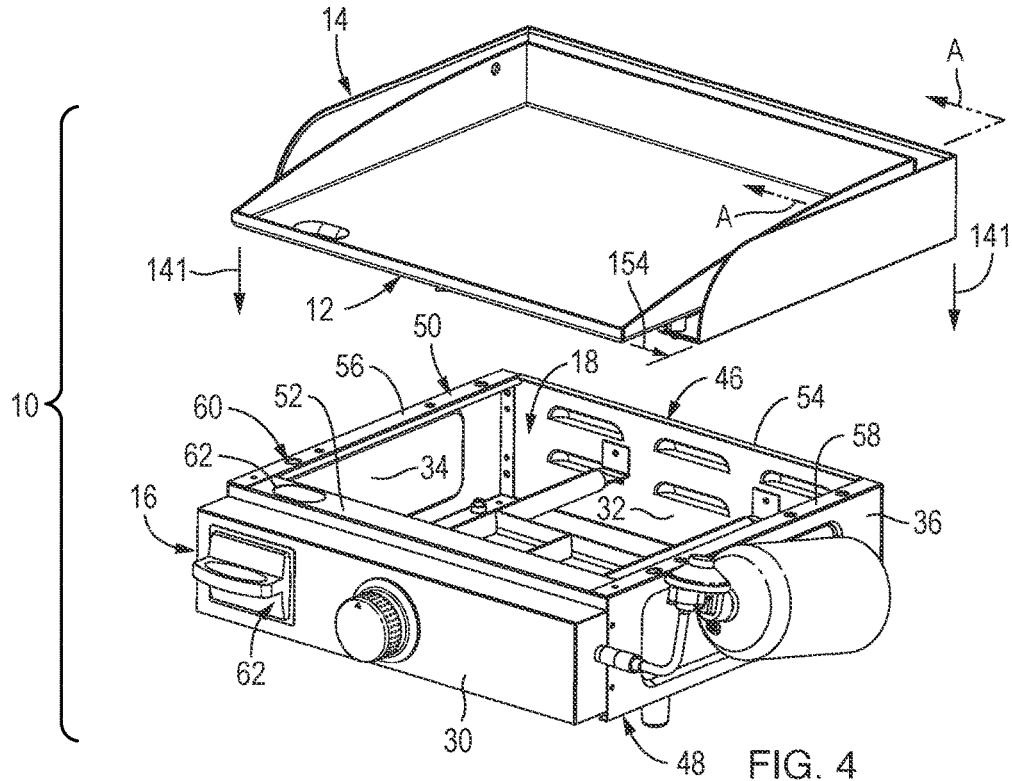
FIG. 4

COOKING SYSTEM INCLUDING WIND GUARD DEVICE AND METHOD THEREOF

CROSS-REFERENCE TO RELATED APPLICATIONS

This application claims the benefit of U.S. Provisional Application No. 63/192,485, filed May 24, 2021, the disclosure of which is hereby incorporated by reference herein in its entirety.

TECHNICAL FIELD

The present invention relates generally to outdoor type cooking stations and, more specifically, the present invention relates to a wind guard system for at least partially blocking crosswind at the outdoor type cooking stations.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame burners. One problem with using a griddle directly on a grill or over flame burners is the control of the temperature of the griddle cooking surface. This is especially true in windy outdoor conditions.

BRIEF SUMMARY OF THE INVENTION

The present invention is directed to a cooking system configured to minimize cross-winds while cooking a food product. In one embodiment, the cooking system includes a cooking station, a griddle and a wind guard. The cooking station includes a main body extending from an upper side toward a lower side to define a front side, a rear side, a left side and a right side. Such cooking station includes one or more flame burners supported by the main body. The griddle extends to define a cooking surface and an oppositely facing underside surface, the underside surface including griddle legs extending therefrom. The underside surface extends to define a front periphery, a rear periphery, a left periphery and a right periphery, the front periphery extending parallel relative to the rear periphery, and the left periphery extending parallel relative to the right periphery. The wind guard extends to define a barrier portion and an engaging portion. With this arrangement, the engaging portion is coupled to at least two of the griddle legs such that, upon the griddle being positioned over the main body and the one or more flame burners, the barrier portion of the wind guard extends to at least partially block a gap between the underside surface of the griddle and the upper side of the main body.

In another embodiment, the wind guard extends with a u-shaped configuration such that the barrier portion is configured to block the gap along the rear periphery of the griddle and extends to at least partially block the gap along the left and right peripheries of the griddle. In another embodiment, the barrier portion extends with a rear barrier, a left barrier, and a right barrier, the left and right barriers extending from opposing ends of the rear barrier. In a further embodiment, the left and right barriers are fixedly coupled to the opposing ends of the rear barrier. In still another embodiment, the engaging portion extends inward relative to the left and right barriers to define left and right extensions, respectively.

In another embodiment, the engaging portion includes holes defined therein, the holes sized and configured to receive at least two of the griddle legs therein to couple the engaging portion to the griddle. In another embodiment, at least two of the griddle legs are configured to be positioned through the holes of the engaging portion and through recesses defined in the upper side of the main body. In another embodiment, the upper side of the main body includes a ledge along at least the left and right sides of the main body, the ledge including at least two recesses defined therein such that the at least two recesses are sized and configured to receive the at least two of the griddle legs of the griddle. In yet another embodiment, the griddle legs include a leg base and a leg end portion, the leg base defining a height that corresponds with the gap.

In another embodiment, the left and right barriers are pivotably coupled to the rear barrier such that the left and right barriers are configured to pivotably rotate so that the wind guard is moveable from a use position to a storage position. In still another embodiment, the rear barrier includes an adjustment portion such that the rear bather is longitudinally adjustable to move between a first length and a second length.

In accordance with another embodiment of the present invention, a wind guard for blocking a cross-wind while cooking a food product on a griddle with griddle legs positioned on a cooking station such that a gap is defined between an upper side of the cooking station and an underside of the griddle is provided. The wind guard includes a barrier portion and an engaging portion. The engaging portion is coupled to at least two of the griddle legs such that, upon the griddle being positioned on the upper side of the cooking station, the barrier portion extends from the engaging portion and extends with a generally u-shaped structure such that the u-shaped structure extends to at least partially block the gap between an underside surface of the griddle and the upper side of the cooking station so as to extend along a rear periphery of the griddle and extend along left and right peripheries of the griddle.

In another embodiment, the barrier portion extends with a rear barrier, a left barrier, and a right barrier, the left and right barriers extending from opposing ends of the rear barrier. In another embodiment, the left and right barriers are fixedly coupled to the opposing ends of the rear barrier. In yet another embodiment, the left and right barriers are pivotably coupled relative to the rear barrier such that the left and right barriers are configured to pivotably rotate so that the wind guard is moveable from a use position to a storage position. In still another embodiment, the rear barrier includes an adjustment portion such that the rear barrier is longitudinally adjustable to move between a first length and a second length.

In accordance with another embodiment of the present invention, a method for substantially blocking wind between a gap of a griddle type cooking station is provided. The method steps include: providing a griddle with griddle legs configured to be positioned on an upper side of a cooking station such that the gap is defined between an underside of the griddle and the upper side of the cooking station; and coupling an engaging portion of a wind guard to at least two of the griddle legs such that, upon the griddle being positioned on the upper side of the cooking station, a barrier portion of the wind guard extends from the engaging portion and extends with a generally u-shaped structure such that the u-shaped structure extends to at least partially block the gap along a rear periphery of the griddle and along left and right peripheries of the griddle.

In another embodiment, the method further includes removing the wind guard from the griddle legs of the griddle such that the u-shaped structure extends with at least a rear barrier, a left barrier and a right barrier, the left and right barriers being fixedly coupled to opposing ends of the rear barrier. In still another embodiment, the method further includes removing the wind guard from the griddle legs of the griddle such that the u-shaped structure extends with at least a rear barrier, a left barrier and a right barrier, the left and right barriers being pivotably coupled to the rear barrier such that the left and right barriers are configured to pivotably rotate so that the wind guard is moveable from a use position to a storage position. In another embodiment, the method further includes removing the wind guard from the griddle legs of the griddle such that the u-shaped structure extends with at least a rear barrier, a left barrier and a right barrier, the left and right barriers being coupled to opposing ends of the rear barrier, the rear barrier having an adjustment portion such that the rear barrier is longitudinally adjustable to move the rear barrier to extend between a first length and a second length.

In accordance with another embodiment, the present invention is directed to a cooking system utilized to control, manage and block crosswinds allowing heat to continually warm a cooking top while cooking a food product. In one embodiment, the cooking system includes a cooking station, cooking top and wind guard. The cooking station having a frame with a top end and bottom end. The top end extends continuously to define a front wall, rear wall, left wall and right wall, the bottom end corresponds to the top end. Further, the top end and the bottom end being open and having an inner portion, the inner portion containing a flame burner or multiple flame burners to create a heat. The cooking top being a griddle, the griddle being configured and sized to sit on the top end of the cooking station frame. The griddle having an upper surface and an underside surface, the upper surface extending outwards to a front end, rear end, left end and right end. The front end, rear end, left end and right end extending upwards from the upper surface to define a side wall, the side wall having a front side wall, rear side wall, left side wall and right side wall. The underside surface extending outwards to correspond with the upper surface. The left end and right end of the underside surface having two short legs extending downwards. The short legs being sized and configured to be positioned on the top end of the cooking station defining a gap between the underside surface and the top end of the cooking station. The wind guard being sized and configured to sit between the top end of the cooking station and the underside surface of the griddle. The wind guard having a rear barrier, left barrier, and right barrier. The rear barrier, left barrier, and right barrier extending upwards to define an upper end and extending downwards to define a lower end. The lower end having a lower extension extending perpendicular and inward from the rear barrier, left barrier and right barrier. The lower extension defining a rear extension, left extension and right extension. The rear barrier is integrally formed to the left barrier and right barrier and the rear extension is integrally formed to the left extension and right extension.

In another embodiment, the rear barrier is integrally formed on opposite ends to the left barrier and right barrier in such a way that the wind guard is a u-shape. Further, the rear barrier, left barrier and right barrier are integrally attached to the rear extension, left extension and right extension. In another embodiment, the rear barrier, left barrier and right barrier extend to define a height of the rear barrier, left barrier and right barrier which is a common height. The left barrier and right barrier extend to define a forward end and back end. The left barrier and right barrier extend perpendicular from the rear barrier to the forward end to define a rounded periphery.

In another embodiment, the left extension and right extension include two circular openings on opposite ends which are the forward and back end. The circular openings are sized and configured to have the short legs of the griddle insert through. The short legs of the griddle are sized and configured to insert into the top end of the cooking station.

In another embodiment, the griddle includes a grease spout along the length of the rear end of the upper surface and an elongated slot along the length of the rear side wall positioned above the grease spout. The rear extension of the wind guard includes a tiered portion which is located directly under the grease spout of the griddle when the wind guard and griddle are assembled. The tiered portion extends the width of the rear extension.

In another embodiment, the lower extension rests on the top end of the cooking station and extends outward and past the rear wall, left wall and right wall of the cooking station. The rear barrier, left barrier and right barrier extends upwards from the lower extension to define a space between the barrier and the rear side wall, left side wall and right side wall of the griddle. Further, the rear barrier, left barrier and right barrier extends parallel to the rear side wall, left side wall and right side wall of the griddle. The rear barrier, left barrier and right barrier block the gap defined by the top end of the cooking station and the underside surface of the griddle. Even further, the rear barrier, left barrier and right barrier extend past the rear side wall, left side wall and right side wall of the griddle.

In accordance with another embodiment of the present invention, a cooking system utilized to control, manage and block crosswinds allowing heat to continually warm a cooking top while cooking a food product. The cooking top being positioned on a cooking station such that a gap is defined between the cooking station and the cooking top, the cooking system comprising of a cooking top and wind guard system. The cooking top being a griddle, being configured and sized to sit on a cooking station. The griddle having an upper surface and an underside surface. The upper surface extending outwards to a front end, rear end, left end and right end. The front end, rear end, left end and right end extending upwards from the upper surface to define a side wall. The side wall having a front side wall, rear side wall, left side wall and right side wall. The underside surface extending outwards to correspond with the upper surface. The left end and right end of the underside surface having two short legs extending downwards. The short legs being sized and configured to be positioned on the cooking station defining a gap between the underside surface of the griddle and the cooking station. The wind guard being sized and configured to sit between the cooking station and the underside surface of the griddle. The wind guard having a rear barrier, left barrier, and right barrier. The rear barrier, left barrier, and right barrier extending upwards to define an upper end and extending downwards to define a lower end. The lower end having a lower extension extending perpendicular and inward from the rear barrier, left barrier and right barrier. The lower extension defining a rear extension, left extension and right extension. The rear barrier being integrally formed to the left barrier and right barrier and the rear extension being integrally formed to the left extension and right extension.

In another embodiment, the rear barrier is integrally formed on opposite ends to the left barrier and right barrier in such a way that the wind guard is a u-shape. Further, the rear barrier, left barrier and right barrier are integrally attached to the rear extension, left extension and right extension. The rear barrier, left barrier and right barrier extend to define a height which is a common height. The left barrier and right barrier extend to define a forward end and back end. The left barrier and right barrier extend perpendicular from the rear barrier to the forward end to define a rounded periphery.

In another embodiment, the left extension and right extension include two circular openings on opposite ends which are on the forward end and back end. The circular openings are sized and configured to have the short legs of the griddle insert through. The short legs of the griddle are sized and configured to insert into the cooking station.

In another embodiment, the griddle includes a grease spout along the length of the rear end of the upper surface and an elongated slot along the length of the rear side wall positioned above the grease spout. The rear extension of the wind guard includes a tiered portion. The tiered portion is located directly under the grease spout of the griddle when the wind guard and griddle are assembled. The tiered portion extends the width of the rear extension.

In another embodiment, the lower extension rests on the top end of the cooking station and extends outward and past a periphery of the cooking station. The rear barrier, left barrier and right barrier extends upwards from the lower extension to define a space between the barrier and the rear side wall, left side wall and right side wall of the griddle. The rear barrier, left barrier and right barrier extends parallel to the rear side wall, left side wall and right side wall of the griddle where the rear barrier, left barrier and right barrier block the gap defined by the cooking station and the underside surface of the griddle. The rear barrier, left barrier and right bather extend past the rear side wall, left side wall and right side wall of the griddle.

In accordance with another embodiment of the present invention, a wind guard system utilized to control, manage and block crosswinds allowing heat to continually warm a cooking top. The cooking top being positioned on a cooking station such that a gap is defined between the cooking station and an underside surface of the cooking top. The cooking top including a front end, rear end, left end and right end. The wind guard system comprising of a wind guard being sized and configured to sit between the cooking station and the underside surface of the cooking top. The wind guard having a rear barrier, left barrier, and right barrier. The rear barrier, left barrier and right barrier extending upwards to define an upper end and extending downwards to define a lower end. The lower end having a lower extension extending perpendicular and inward from the rear barrier, left barrier and right barrier. The lower extension defining a rear extension, left extension and right extension. The rear barrier being integrally formed to the left barrier and right barrier and the rear extension is integrally formed to the left extension and right extension.

In another embodiment, the rear barrier is integrally formed on opposite ends to the left barrier and right barrier in such a way that the wind guard is a u-shape. Further, the rear barrier, left barrier and right barrier are integrally attached to the rear extension, left extension and right extension. The rear barrier, left barrier and right barrier extend to define a height which is a common height. The left barrier and right barrier extend to define a forward end and back end. The left barrier and right barrier extend perpendicular from the rear barrier to the forward end to define a rounded periphery.

In another embodiment, the left extension and right extension include two circular openings on opposite ends. The circular openings being located on the forward end and back end. The circular openings are sized and configured to have one or more short legs of the cooking top to insert through. The short legs of the cooking top being sized and configured to insert into the cooking station.

In another embodiment, the cooking top includes a grease spout and an elongated slot along the length of the rear end. The rear extension of the wind guard includes a tiered portion. The tiered portion is located directly under the grease spout of the cooking top when the wind guard and cooking top are assembled on the cooking station. Further, the tiered portion extends the width of the rear extension.

In another embodiment, the lower extension rests on the cooking station and extends outward and past a periphery of the cooking station. The rear barrier, left barrier and right barrier extends upwards from the lower extension to define a space between the barrier and the cooking top. The rear barrier, left barrier and right barrier extends parallel to a side wall of the cooking top. Further, the rear barrier, left barrier and right barrier block the gap defined by the cooking station and the underside surface of the cooking top. The rear barrier, left barrier and right barrier extend past the side wall of the cooking top.

In accordance to another embodiment of the present invention, a method for substantially managing and blocking wind from a flame heat source between a gap of a griddle cooking top and a cooking station. The method includes the following steps: providing a cooking station having a frame with a top end and bottom end. The top end extending continuously to define a front wall, rear wall, left wall and right wall. The bottom end corresponding to the top end. The top end and the bottom end being open and having an inner portion. The inner portion containing a flame burner or multiple flame burners to create a heat. The burner or multiple burners extending from the rear wall to the front wall. The cooking station including a griddle being sized to correspond with the top end of the frame. The griddle including an upper surface and an underside surface. The upper surface extending to define a front end, rear end, left end and right end. The front end, rear end, left end and right end extending upwards to define a front side wall, rear side wall, left side wall and right side wall. The underside surface extending outwards to correspond with the upper surface. The left end and right end of the underside surface having two short legs extending downwards. The short legs being sized and configured to be positioned on the top end of the frame of the cooking station and defining a gap between the underside surface of the griddle cooking top and the top end of the frame; and positioning a wind guard between the top end of the frame and the underside surface of the griddle. The wind guard having a rear barrier, left bather and right barrier. The rear barrier, left barrier and right barrier extending upwards to define an upper end and extending downwards to define a lower end. The lower end having a lower extension extending perpendicular and inward from the rear barrier, left barrier and right barrier. The lower extension defining a rear extension, left extension and right extension. The rear barrier being integrally formed to the left barrier and right barrier such that the wind guard is configured as a u-shape.

In another embodiment, the positioning step comprises the griddle short legs inserting through the circular openings of the wind guard. Further, the griddle short legs insert into the top end of the frame such that the wind guard is positioned between the top end of the frame and the underside surface of the griddle. The wind guard being between the top end of the frame and the underside surface of the griddle, blocking the gap between the top end of the frame and the underside surface of the griddle. The wind guard blocking the gap between the top end of the frame and the underside surface of the griddle, protecting the flame burner from crosswinds. Containing the heat in the inner portion of the cooking station to continually warm the griddle.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 3 is an exploded underside view of the griddle and the wind guard, according to another embodiment of the present invention;

FIG. 4 is a partially exploded view of the griddle type cooking system, depicting the wind guard assembled with the griddle and positioned above the cooking station, according to another embodiment of the present invention;

FIG. 4A is a cross-sectional view of a portion of the griddle type cooking system taken along section line A-A in FIG. 4, according to another embodiment of the present invention;

DETAILED DESCRIPTION OF THE INVENTION

Figure 1:
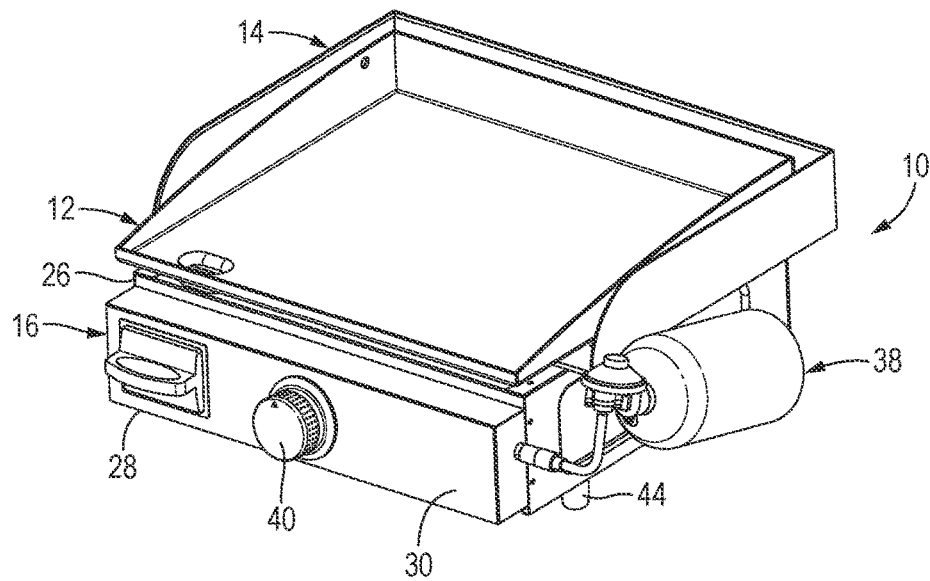
FIG. 1 is a perspective view of a griddle type cooking system with a wind guard positioned between a cooking station and a griddle, according to an embodiment of the present invention.
Figure 2:
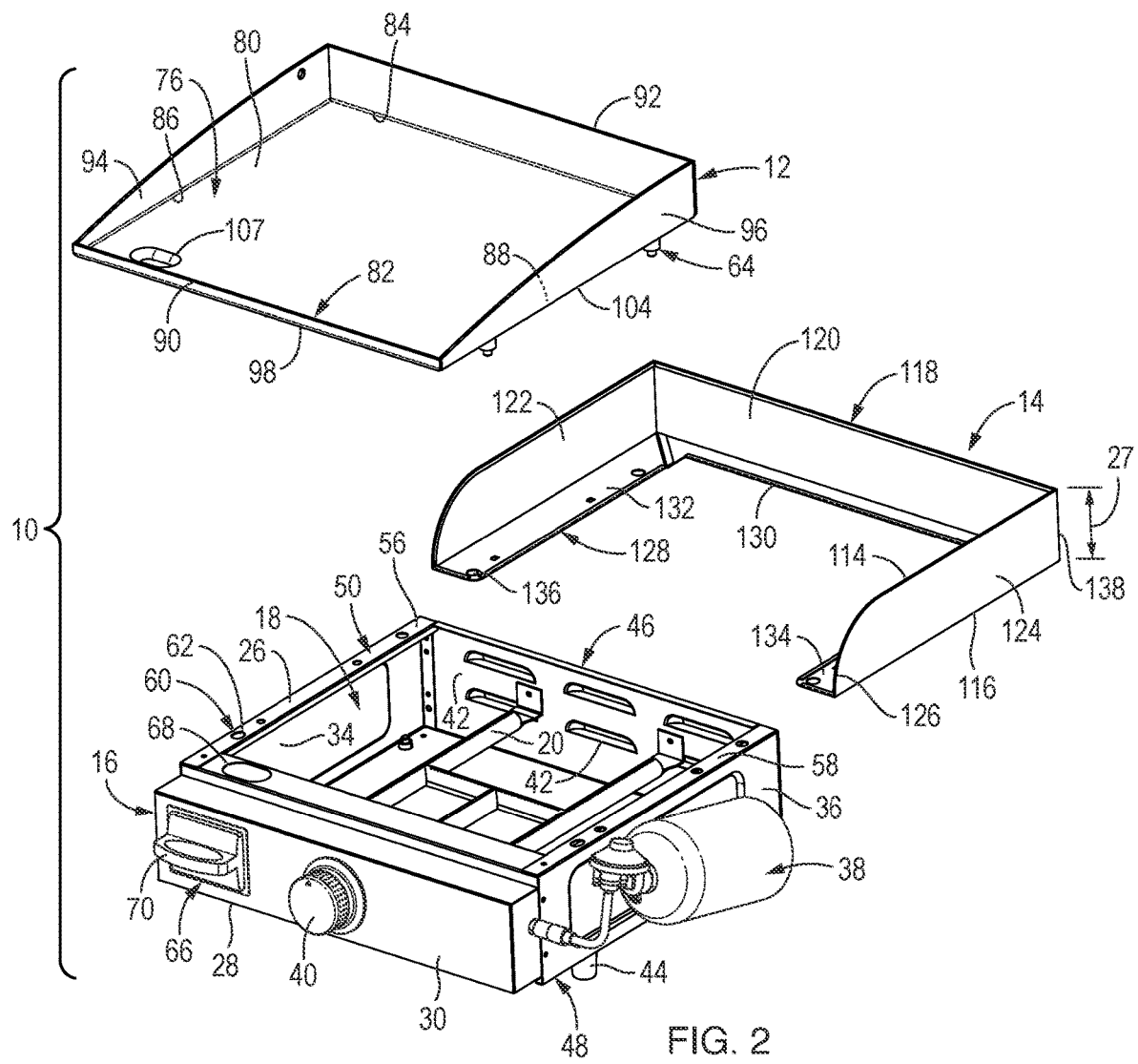
FIG. 2 is an exploded view of the griddle type cooking system, according to another embodiment of the present invention.
Figure 5:
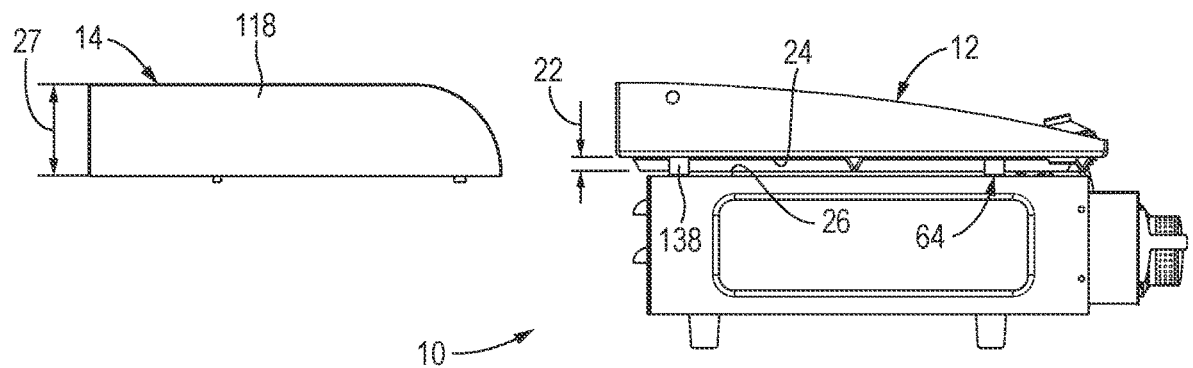
FIG. 5 is a side view of the cooking station with the wind guard positioned rearward of the cooking station, depicting a gap between the griddle and a ledge of the cooking station, according to another embodiment of the present invention.

Referring to FIGS. 1, 2 and 5, a cooking station 10 with a griddle member 12 and a wind guard member 14 is provided. Such wind guard member 14 may be positioned between the cooking station 10 and the griddle member 12 so as to assist in more effectively heating the griddle member 12. The cooking station 10 may include a main body 16 having various frame components which may define an inner portion 18 of the main body 16. The inner portion 18 may include one or more flame burners 20 supported by the main body 16 which may provide heat to the griddle member 12. The wind guard member 14 may be sized and configured to block a crosswind from flowing into a gap 22 defined between an underside surface 24 (FIG. 3) of the griddle member 12 and a top end 26 of the main body 16 of the cooking station 10. The wind guard member 14 may extend with a height 27 so that when positioned on the top end 26 of the cooking station 10 the height 27 of the wind guard member 14 may extend from the top end 26 of the cooking station 10 and over at least a portion of the gap 22. When the wind guard member 14 is employed in such a manner the wind guard member 14 may at least partially block the gap 22 and may assist or substantially prevent crosswinds from flowing through the gap 22 and into the inner portion 18 of the frame 16. With this arrangement, the wind guard member 14 may be sized and configured to block air flow or crosswinds from moving through the gap 22 to allow the flame burners 20 to burn more effectively such that the flame burners 20 may be able to generate a more continuous flame so as to more efficiently heat the griddle member 12.

With reference to FIGS. 1 and 2, the cooking station 10 may include the main body 16 with the top end 26 or a top side and a bottom end 28 or bottom side. The main body 16 may further define a front wall 30, rear wall 32, left wall 34 and right wall 36 each of which may extend between the bottom end 28 and the top end 26 such that the bottom end 28 may extend to correspond with the top end 26. The top end 26 and bottom end 28 may extend to surround the inner portion 18. Further, the inner portion 18 may be open on the top end 26 and the bottom end 28 and, as such, may be encased by the front, rear, left and right walls 30, 32, 34, 36. In another embodiment, the bottom end 28 or bottom side may extend with a bottom wall to enclose the bottom side of the main body 16.

Further, as previously set forth, the one or more flame burners 20 may be positioned and supported within the inner portion 18 of the main body 16. Such one or more flame burners 20 may employ various structural and functional components sized and configured to facilitate generating and controlling heat at the cooking station 10, as known to one of ordinary skill in the art. The flame burners 20 may produce an open flame and come in multiple configurations. For example, the flame burner 20 may be an H-shaped burner or multiple elongated tube burners, both of which may produce an open flame to heat the griddle member 12. The heat may be produced by a gas source 38 which may be a propane or natural gas source. The flame burner 20 may extend from the front wall 30 to the rear wall 32. The front wall 30 may contain one or more burner control knobs 40 and valves which may be positioned to correlate and connect to the respective ones of one or more flame burners 20. In addition, the front wall 30 may contain an ignitor switch that may be sized and configured to ignite gas supplied to the flame burners 20 to produce a flame. For example, the ignitor switch may produce a spark to the flame burners 20 which may ignite gas supplied from the gas source 38 within the flame burners 20. Further, the ignitor switch may be located on the front wall 30 as an ignitor button or within the one or more burner control knobs 40 that may automatically ignite upon turning any one of the one or more knobs 40. The rear wall 32 may include multiple elongated vents 42 which may occur multiple times along the length of the rear wall 32. The elongated vents 32 may assist in supplying air flow into the inner portion 18 to supply oxygen to the one or more burners 20. Further, in some embodiments, the left and/or right walls 34, 36 may include the elongated vents 32 therein to allow for further ventilation to the inner portion 18 of the main body 16. The main body 16 of the cooking station 10 may be sized and configured in such a way to effectively support multiple sizes and configurations of the griddle member 12 or a cooking top. Further, the cooking station 10 may include typical structural and functional components implemented therewith, such as valves, tubing, fasteners, and various frame components to properly utilize the cooking station 10 as well as appropriately supply and control the fuel implemented with the cooking station 10, as known to one of ordinary skill in the art.

Further, the bottom end 28 or bottom side of the frame 16 may include legs 44 that may be placed on a flat surface to stabilize the cooking station 10. The legs 44 may include longer leg attachments or extendable legs to raise the cooking station 10. In some embodiments, legs of the cooking station may include structure and functionality that may allow the cooking station 10 to become readily portable and, in some embodiments, compactable such that the cooking station 10 may be readily placed within a vehicle for travel. Further, in some embodiments, legs of the cooking station 10 may include caster wheels at the lower ends of the legs to further facilitate portability. In some embodiments, the main body 16 may include one or more side handles to assist in moving the cooking station 10. Further, in some embodiments, the main body 16 may include further structural components or attachments, such as one or more side shelves, located adjacent the left wall 34 and/or the right wall 36 to provide a flat work space adjacent the griddle member 12 to place various items.

Now with reference to FIGS. 2 and 4, the front, rear, left and right walls 30, 32, 34, 36 may extend upwards and downwards (or vertically) between a rectangular top periphery 46 and a bottom periphery 48 which may also define the respective top and bottom ends 26, 28 of the main body 16. The top periphery 46 may include a ledge 50 that may correspond to the front, rear, left and right walls 30, 32, 34, 36 such that the ledge extends along the entire top periphery. For example, the ledge 50 may extend to define a front ledge 52, rear ledge 54, left ledge 56 and right ledge 58 that may extend inward and perpendicular relative to the respective front, rear, left and right walls 30, 32, 34, 36. The flame burners 20 may extend in the inner portion 18 of the main body 16 between the front wall 30 and the rear wall 32 at a position below the top periphery 46 and above the bottom periphery 48. In some embodiments, the bottom periphery 48 of the inner portion 18 of the main body 16 may contain further frame components and structures below the inner portion 18, such as elongated legs, cabinetry, etc., which may aid in the stability of the main body 16 and may suspend the main body similar to a counter-top height. In some embodiments, the front ledge 52 of the ledge 50 may be larger than the rear, left and right ledges 54, 56, 58. In another embodiment, the left and right ledges 56, 58 may longitudinally extend parallel relative to each other. In still another embodiment, the left and right ledges 56, 58 extend along opposite sides of the main body 16 and may extend inwards to define a width that is smaller than the front ledge 52. Such width may be large enough to incorporate holding structure 60 defined in the ledge 50, the holding structure 60 sized and configured to support the griddle member 12. In another embodiment, the rear ledge 54 may extend at a more narrow width than that of the left ledge 56 and right ledge 58.

The left ledge 56 and right ledge 58 may be sized and configured to extend as a flat surface and incorporate the holding structure 60 therewith for holding and supporting the griddle member 12. In one embodiment, the holding structure 60 may be in the form of circular recesses 62 or through holes defined in the left and right ledges 56, 58. In one embodiment, the circular recesses may extend with a keyed circular shape so as to be similar to a key hole. In another embodiment, the circular recesses may be oval in shape. In any of the embodiments, the holding structure 60 may be sized and configured to receive structure of the griddle member 12, such as griddle legs 64 (see FIG. 3). Further, the left ledge 56 and right ledge 58 may be sized and configured to properly stabilize and hold the griddle member 12. In addition, the griddle member 12 may be positioned on or over the top end 26 of the main body 16 of the cooking station 10.

In a further embodiment, a grease drawer 66 may be located along the length of the front wall 30 and may sit below the front ledge 52. Further, the front ledge 52 may define an oval recess 68 therein located above the grease drawer 66 that may allow for grease and unwanted food product to flow from the griddle member 12, through the oval recess 68 and into the grease drawer 66. The grease drawer 66 may include a centrally located lip 70 to allow for an easy grip to pull the grease drawer 66 out from the front wall 30 to dispose of the grease therein.

Now with reference to FIGS. 2 and 3, the griddle member 12 may be sized and configured to correspond with the top periphery 46 of the cooking station 10. The griddle member 12 may include an upper surface 76 and an underside surface 24. The upper surface 76 may be a flat cooking surface 80 that may be rectangular or square in shape and extends to define a front end 82, rear end 84, left end 86 and right end 88. The front end, rear end, left end and right end 82, 84, 86, 88 may extend upwards perpendicular to the upper surface 76 to define a front side wall 90, rear side wall 92, left side wall 94 and right side wall 96. The front side wall, rear side wall, left side wall and right side wall 90, 92, 94, 96 may extend upwards a height that may prevent grease or other food products from overflowing or causing splatter outside the griddle member 12. The rear side wall 92, left side wall 94 and right side wall 96 may extend along their respective lengths at a common height along the rear end, left end and right end 84, 86, 88 respectively. In another embodiment, the rear side wall 92 may extend upwards at a constant height along the length of the rear end 84 and the left side wall 94 and right side wall 96 may have a height which tapers along the length of the left end 86 and right end 88 respectively. For example, the left side wall 94 and right side wall 96 may have a height which is taller in length near the rear end 84 and tapers as to a shorter length near the front end 82. The front side wall 90 may extend upwards a height which is shorter than that of the rear side wall 92, left side wall 94 and right side wall 96 such that a user is able to cook food product on the upper surface 76 without the front side wall 90 obstructing the users ability. In another embodiment, any one of the front, rear, left and/or right side walls may also be referenced as a splash guard.

In another embodiment, the underside surface 24 may extend to correspond with the upper surface 76 so as to define a front periphery 98, rear periphery 100, left periphery 102 and right periphery 104. The left periphery 102 and right periphery 104 may each include two of the griddle legs 64 extending downwards from the underside surface 24 of the griddle member 12 such that adjacent each of the left and right periphery 102, 104, the two griddle legs 64 may be spaced relative to each other. The griddle legs 64 may be sized and configured to be inserted into the circular recesses 62 of the cooking station 10.

The griddle legs 64 may be sized and configured to stabilize the griddle member 12 as the griddle member 12 is positioned, inserted and sitting on or above the top end of the cooking station 10. The underside surface 24 may include a support structure 106 which may aid in the stabilization of the griddle member 12 as it undergoes thermal stress and/or thermal strain. The support structure 106 may extend along and be fixed to the underside surface 24 of the griddle member 12. The support structure may extend with a diamond-like shape or other shaped structures and may aid to the thermal structural integrity of the griddle member 12.

In another embodiment, the upper surface 76 of the griddle member 12 may include a grease trough 107 or grease drain hole defined in the griddle member that may be positioned along the length of the front end 82 of the griddle member 12. The grease trough 107 may extend through the upper surface 76 to the underside surface 24 of the griddle member 12. Further, the grease trough 107 may be positioned over the oval recess 68 and the grease drawer 66 of the cooking station 10, such that, grease and unwanted food by-product may flow freely into the grease drawer 66.

With continued reference to FIGS. 2 and 3, the wind guard member 14 may extend with a u-shaped configuration or structure and extend to define a barrier portion 118 and an engaging portion 128. The barrier portion of the u-shaped configuration may extend between an upper end 114 and a lower end 116 to define the height 27. Further, the barrier portion 118 may extend to define a rear bather 120, left barrier 122 and right barrier 124. The rear, left and right barriers 120, 122, 124 may extend to define the height 27. The height 27 of the rear barrier, left barrier and right barrier 120, 122, 124 may be a common height. In another embodiment, the height may taper or the height of the rear barrier 120 may be different than the height of the left and right barriers 122, 124. The rear, left and right barriers 120, 122, 124 may be fixed relative to each other and may extend substantially perpendicular relative to each other so as to extend in the u-shaped configuration. For example, one end of the left and right barriers 122, 124 may be integrally formed to opposite ends of the rear barrier 120. The left and right barriers 122, 124 may extend parallel relative to each other and may each extend perpendicular and outwards away from the rear barrier 120 to define a forward end 126. The height 27 of the left and right barrier 122, 124 may extend along the length and may round downwards at the forward end 126 towards the lower end 116.

The engaging portion 128 or lower extension may extend inward from the lower end 116 of the barrier portion. Such engaging portion 128 may include corresponding portions that may extend substantially perpendicular and inwards from the rear, left and right barriers 120, 122, 124. For example, the engaging portion 128 may extend along the length of each of the rear, left and right barriers 120, 122, 124 so as to define a rear extension 130, a left extension 132 and a right extension 134, respectively. The rear extension 130 may be fixed relative to the left extension 132 and the right extension 134 such that the engaging portion 128 may extend as a single continuous body. In another embodiment, the wind guard member 14, including its barrier and engaging portions 118, 128, may extend as a single integrally formed component. In this manner, the engaging portion 128 may be attached to the barrier portion 118 in such a way that the barrier portion 118 and lower extension 128 may be a continuously extending structure or body making up the wind guard member 14. The rear, left and right extensions 130, 132, 134 may extend inwards with a width. The left and right extension 132, 134 may extend to define a common width or a first width and the rear extension 130 may have a shorter width than that of the left and right extension 132, 134. In another embodiment, the rear extension 130 may extend with a similar width to that of the left and right extensions 132, 134. The left and right extensions 132, 134 may include circular openings 136 defined therein. Such circular openings may be located adjacent the forward end 126 and a rear end 138 of the left and right barriers 122, 124. In another embodiment, the circular openings 136 may be defined in the left and right extensions 132, 134 so as to be spaced and to correspond with the griddle legs 64 of the griddle member 12. As such, the circular openings 136 defined in each of the left and right extensions 132, 134 may be sized and configured to facilitate insertion of at least a portion of the griddle legs 64 therein such that the griddle legs 64 engage the circular openings 136 of the engaging portion 128 of the wind guard member 14.

With reference to FIGS. 3 and 4A, as previously set forth, a portion of the griddle legs 64 may engage circular openings 136 of the wind guard member 14. For example, each of the griddle legs 64 may include a leg base 138 and a leg end portion 140. The leg base 138 of the griddle legs 64 may extend directly from the underside surface 24 of the griddle member 12. The leg end portion 140 may extend from one end 142 of the leg base 138 to a leg free end 144. In one embodiment, each leg base 138 and leg end portion 140 may extend with a cylindrical structure or some other structure such that a width of the leg base 138 may be larger than a width of the legend portion 140. That is, the leg base 138 may define a first width 146 and the leg end portion 140 may define a second width 148, the first width 146 being larger than the second width 148. Further, the leg base 138 may extend from the underside surface 24 of the griddle member 12 with a leg base length 150 that may correspond with the height defined by the gap 22 (see FIGS. 5 and 6). Further, the leg end portion 140 may extend to define a leg end portion length 152 such that the leg end portion 140 may be sized and configured to extend completely through the circular holes 136 defined in the engaging portion 128 of the wind guard member 14. Furthermore, the one end 142 of the leg base 138 may be sized and configured to directly contact a surface of the wind guard member 14 that is adjacent the circular holes 136 defined in the engaging portion 128 of the wind guard member 14, discussed further hereafter.

Now with reference to FIGS. 3, 4, 5 and 6, the engaging portion 128 of the wind guard member 14 being positioned between the cooking station 10 and the griddle member 12 will now be described. For example, with reference to FIGS. 3 and 4, the griddle member 12 may be positioned above the wind guard member 14 so that the griddle legs 64 may be aligned with corresponding ones of the circular openings 136 defined in the engaging portion 128 of the wind guard member 14. Once the griddle legs 64 are aligned with the circular openings 136, the griddle member 12 may be moved toward the wind guard member, as depicted by arrows 137, so that the griddle legs 64 may at least partially be inserted through the circular openings 136 of the wind guard member 14 so that the griddle member 12 may be engaged with the engaging portion 128 of the wind guard member 14, as depicted in FIGS. 4 and 4A.

Figure 6:
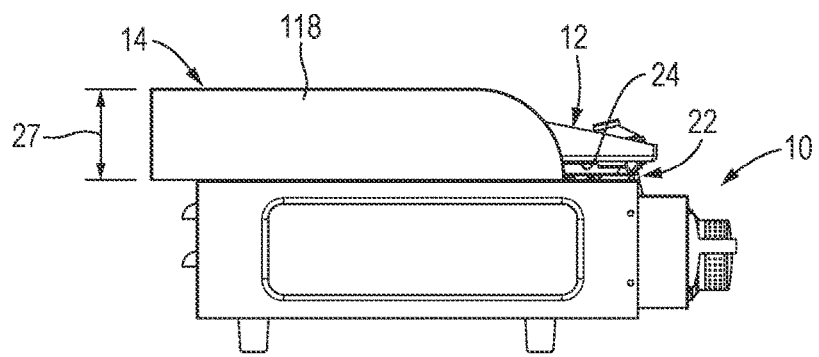
FIG. 6 is a side view of the cooking station, depicting a barrier portion at least partially blocking a gap between the griddle and the cooking station, according to another embodiment of the present invention.
Figure 7:
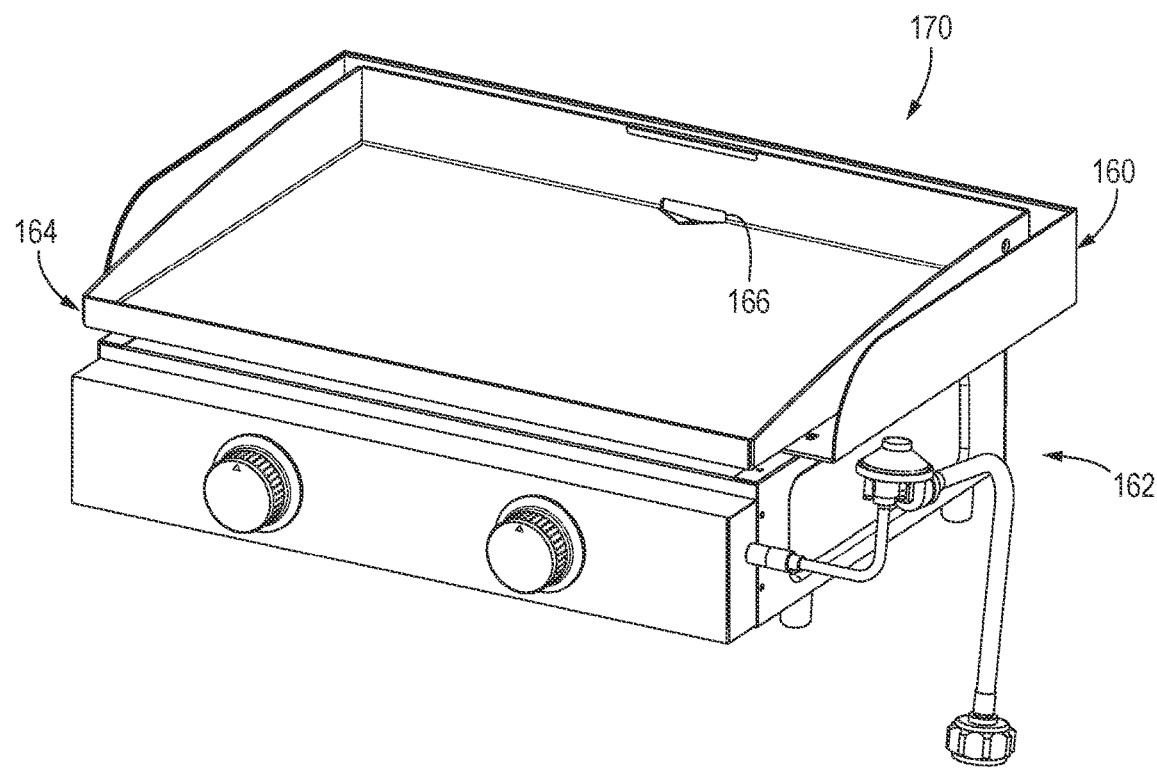
FIG. 7 is a perspective view of another embodiment of a cooking system with a griddle and wind guard positioned on a cooking station.
Figure 8:
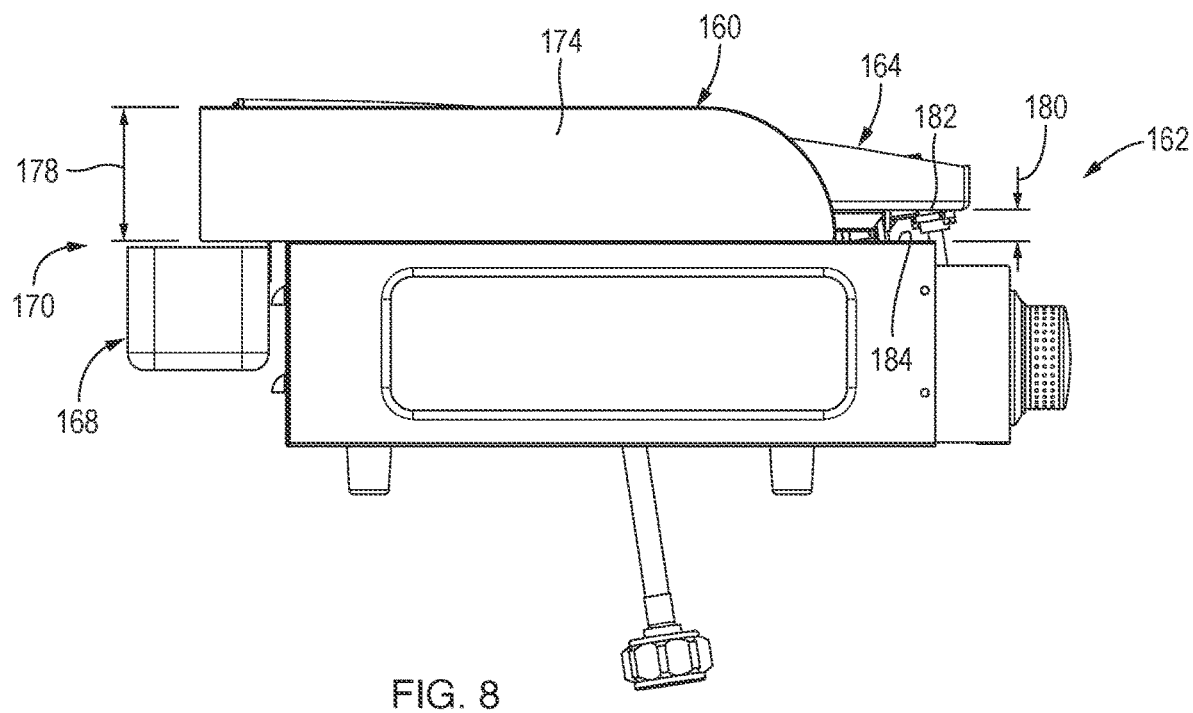
FIG. 8 is a side view of the cooking system of FIG. 7, depicting the wind guard partially blocking a gap between the griddle and the cooking station, according to another embodiment of the present invention.
Figure 9:
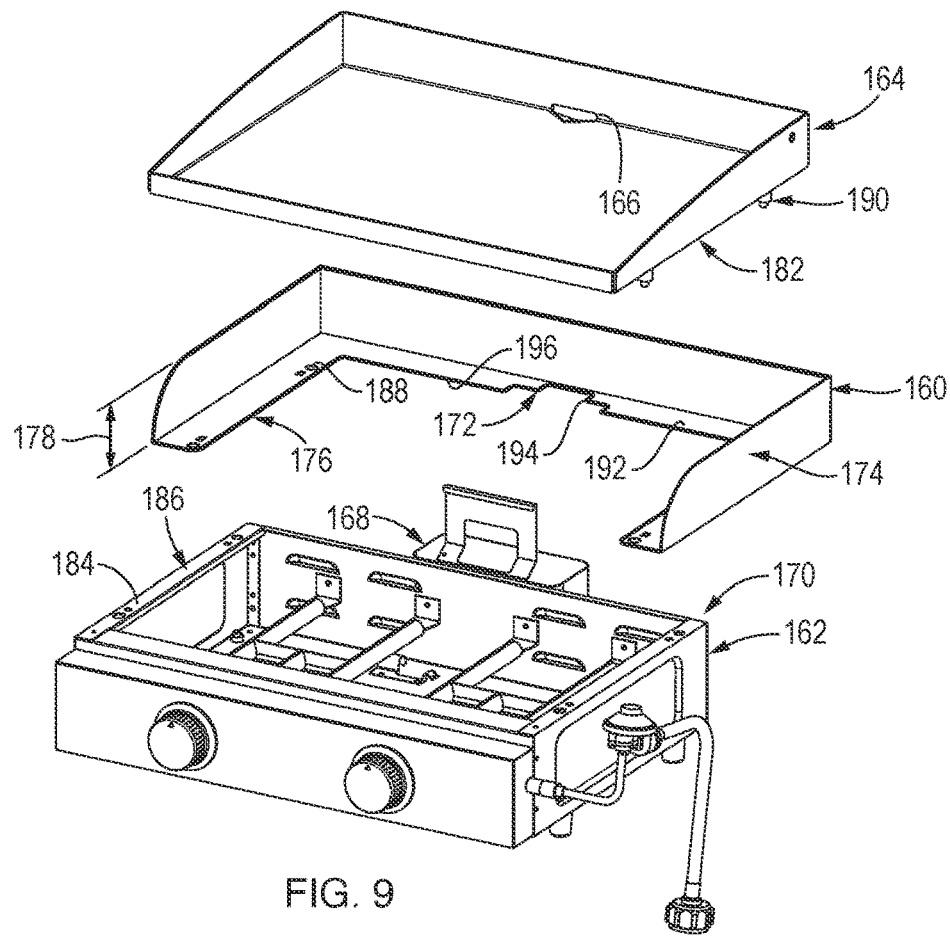
FIG. 9 is an exploded view of the cooking system of FIG. 7, according to another embodiment of the present invention.
Figure 10:
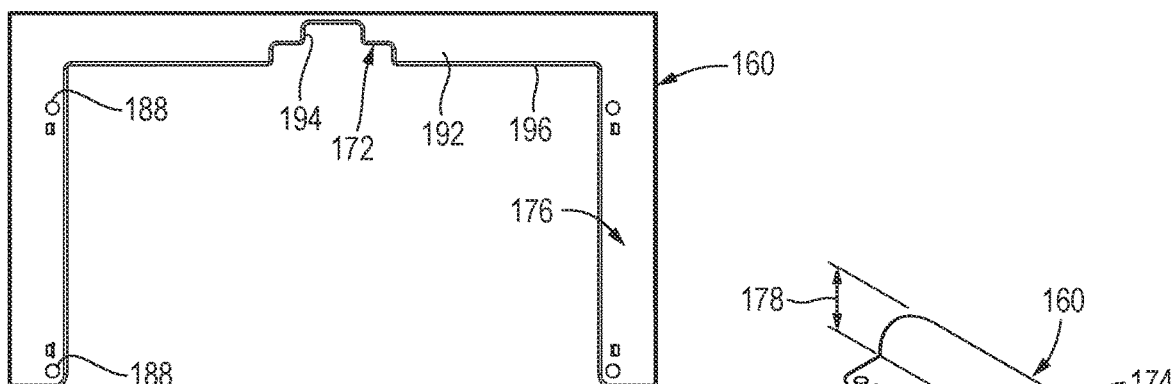
FIG. 10 is a bottom view of the wind guard, according to another embodiment of the present invention.
Figure 11:
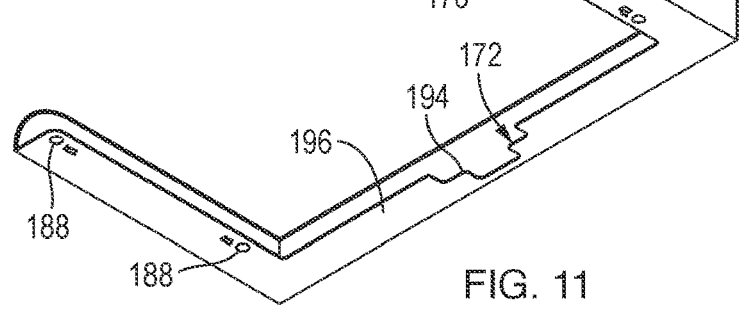
FIG. 11 is a bottom perspective view of the wind guard, according to another embodiment of the present invention.

Referring now to FIGS. 4, 4A and 6, with the leg end portion 140 of the griddle legs 64 at least partially extending through the circular openings 136 of the wind guard member 14, the griddle member 12 may then be positioned over, and moved toward, the cooking station 10 (as depicted by arrows 141) so that the leg end portion 140 of the griddle legs 64 may then be inserted into corresponding ones of the circular recesses 62 defined in the ledge 50 of the cooking station 10. In this manner, the wind guard member 14 may be positioned to engage the griddle legs 64 so that the engaging portion 128 of the wind guard member 14 may be positioned between the cooking station 10 and the griddle member 12.

As previously set forth, with the wind guard member 14 incorporated with the cooking station 10, the barrier portion 118 extends with the height 27 to at least partially block the gap 22 defined between the underside surface 24 of the griddle member 12 and the top end 26 or ledge 50 of the cooking station 10. See also FIG. 5 that best exhibits the gap 22 along one side of the cooking station 10 with the wind guard member 14 positioned rearward thereof (not incorporated with the cooking station 10), depicting an example of the height 27 of the barrier portion 118 in comparison to a height of the gap 22. As previously set forth, the leg base length 150 of the leg base 138 may dictate an approximate distance or height of the gap 22 (see FIG. 4A).

With reference again to FIGS. 1, 4 and 6, the u-shaped configuration of the wind guard member 14 facilitates blocking the gap 22 along an entire rear side of the cooking station 10 and at least partially blocking the gap 22 along left and right sides of the cooking station 10, the rear side corresponding with the rear ledge 54 of the main body 16 and the left and right sides corresponding with the left and right ledges 56, 58 of the main body 16. In another embodiment, the wind guard member 14 may not block the gap 22 along a front side of the cooking station such that the front side corresponds with the front ledge 52 of the main body 16. In this manner, the u-shaped configuration of the wind guard member 14 may partially block the gap 22 defined between the top end 26 of the cooking station 10 and the underside surface 24 of the griddle member 12. Further, the barrier portion 118 of the wind guard member 14 may extend upward from the cooking station and beyond the splash guard of the griddle member 12 such that the barrier portion 118 may extend adjacently spaced and parallel relative to the rear, left and right side walls 92, 94, 96 of the griddle member 12. Also, the rear, left and right extensions 130, 132, 134 (FIG. 3) of the wind guard member may rest on the top end 26 of the cooking station 10 and may extend past (or beyond) the rear, left and right walls 32, 34, 36 of the cooking station 10 to define a space 154 between the left, rear and right side walls 92, 94, 96 of the griddle member 12 and the barrier portion 118 of the wind guard member 14. Such space 154 may be sized and configured to facilitate funneling heat from the underside surface 24 of the griddle member 12 so that the heat from the cooking station 10 may move directly upward alongside a periphery of the griddle member 12 between the splashguard and the barrier portion 118 of the wind guard member 14. In this manner, the barrier portion 118 may channel heat upward alongside the barrier portion 118 so as to block and minimize heat from moving laterally from the cooking station 10.

Now with reference to FIGS. 7-11, another embodiment of a wind guard 160 configured to be positioned between a cooking station 162 and a griddle 164 is provided. In this embodiment, the wind guard 160 may be employed in a similar manner as with the griddle member and cooking station of the previous embodiment, except in this embodiment, the griddle 164 may be configured to drain grease through a rear opening 166 and into a grease container 168 coupled adjacent to a rear side 170 of the cooking station 162 and the griddle 164. Further, in this embodiment, the wind guard 160 may include structure, such as a guard opening 172 defined in the wind guard 160, to accommodate draining grease to the grease container 168 along the rear side 170 of the griddle 164. Similar to the previous embodiment, the wind guard 160 may extend with a u-shaped configuration or structure to define a barrier portion 174 and an engaging portion 176. Further, the barrier portion 174 may define a height 178 that is a greater distance or height than a gap 180 defined between an underside surface 182 of the griddle 164 and a top end 184 or ledge 186 of the cooking station 162. Further, similar to the previous embodiment, the engaging portion 176 may define circular openings 188 therein sized and configured to correspond with griddle legs 190 of the griddle 164. As previously set forth, the wind guard 160 may include the guard opening 166 or notch defined in a rear extension 192 of the engaging portion 176 of the wind guard 160, the guard opening 172 or notch positioned to correspond with the grease container 168 so that grease may effectively drain from the griddle 164, through the rear opening 166, and into the grease container 168. Such guard opening 172 or notch may exhibit a tiered profile 194 defined along an inside periphery 196 of the rear extension 192 and may be centrally located along a length of the rear extension 192 of the engaging portion 176 of the wind guard 160. The wind guard 160 of this embodiment may include the functional and structural components similar to the wind guard member of the previous embodiment and, as such, the description set forth in the previous embodiment is applicable to the wind guard 160 of this embodiment.

Figure 12:
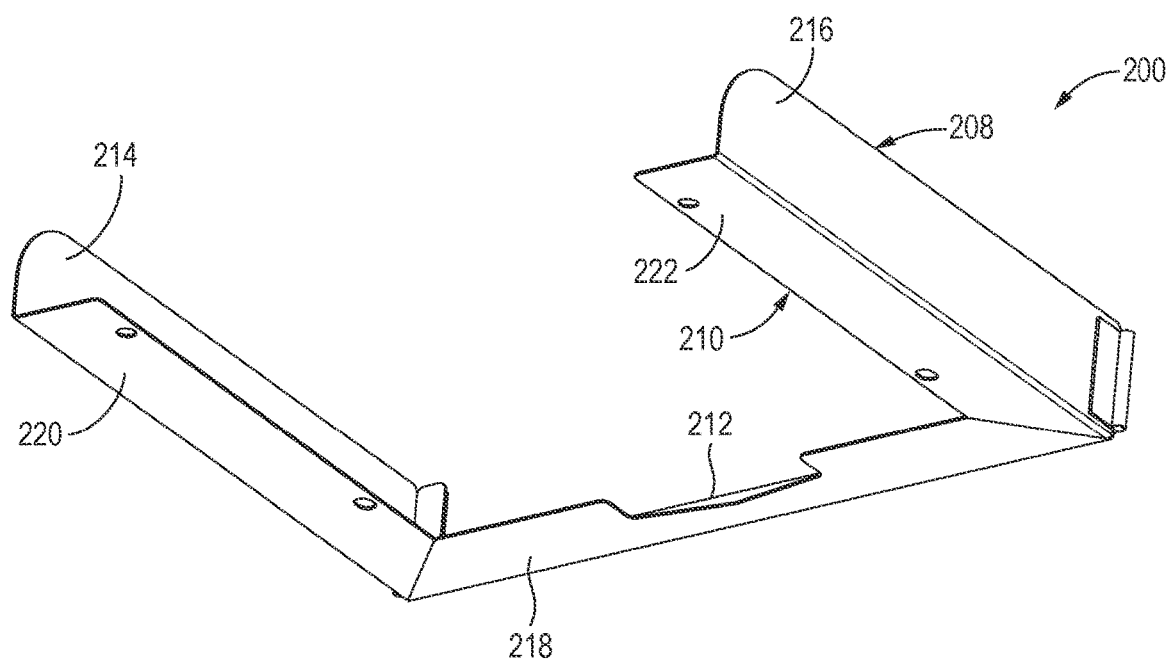
FIG. 12 is a bottom perspective view of another embodiment of a wind guard, according to the present invention.
Figure 13:
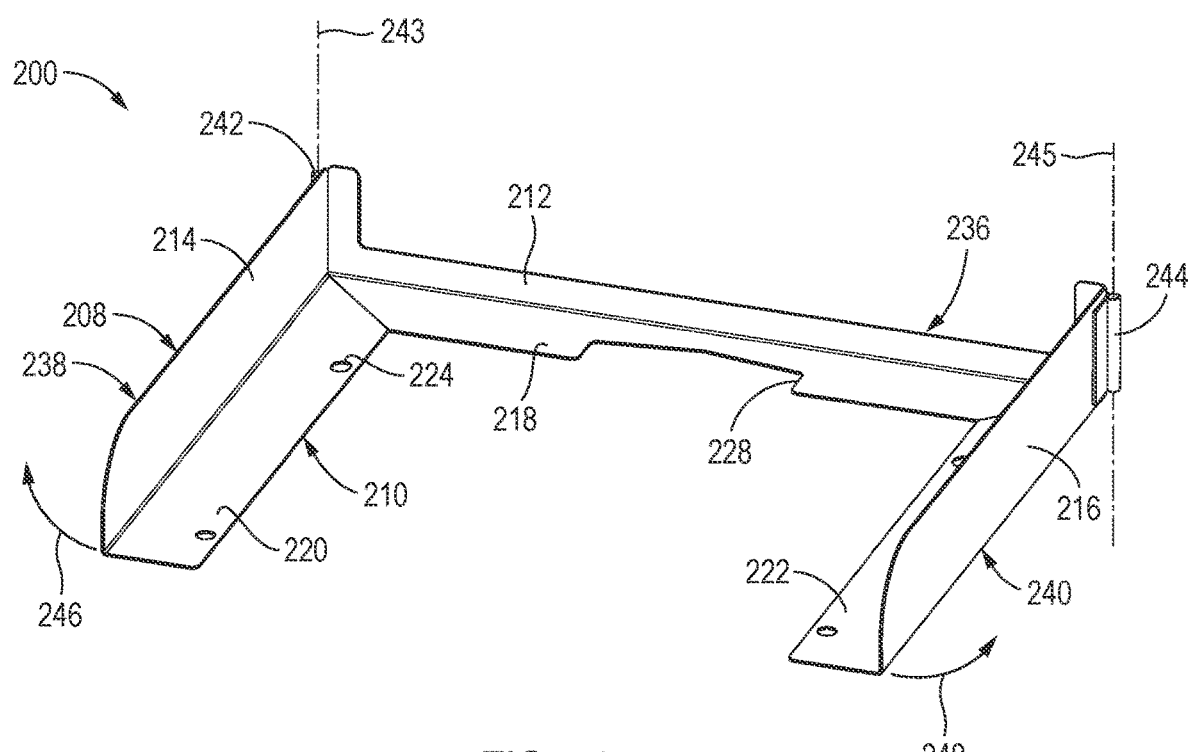
FIG. 13 is a top perspective view of the wind guard of FIG. 12, according to another embodiment of the present invention.
Figure 14:
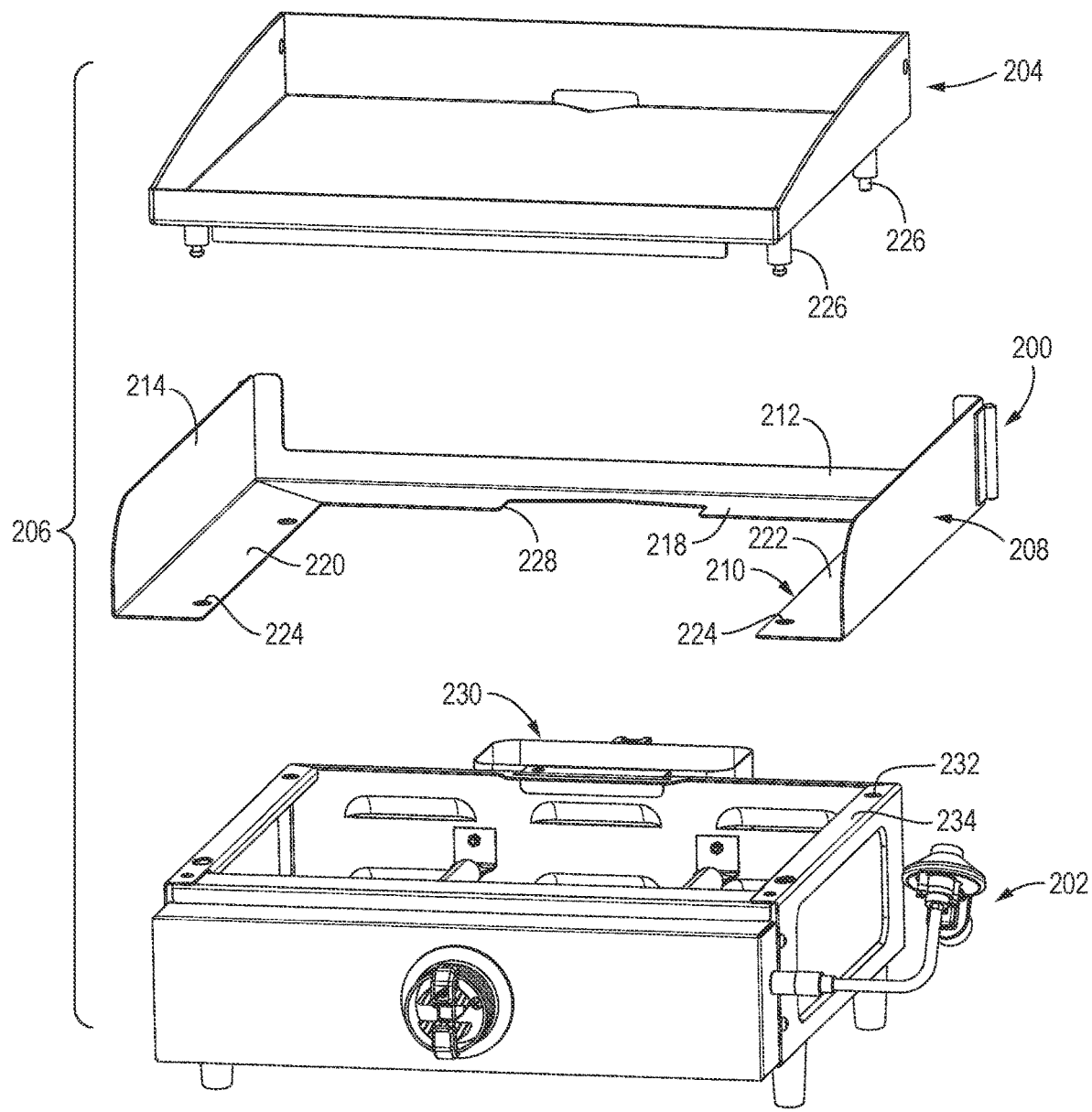
FIG. 14 is an exploded view of a cooking system with the wind guard of FIG. 12, depicting the wind guard positioned between a griddle and a cooking station, according to another embodiment of the present invention.

Now with reference to FIGS. 12-14, another embodiment of a wind guard 200 sized and configured to be positioned between a cooking station 202 and a griddle 204 is provided. In this embodiment, similar to the previous embodiments set forth herein, the wind guard 200 may be employed for the purpose of blocking air flow between a gap between the griddle 204 and the cooking station 202 such that the wind guard 200 may be a component of a cooking system 206. In this embodiment, the wind guard 200 may be minimized in its size such that the wind guard 200 may be moved from a use position to a folded storage position (see FIG. 16).

In the use position, similar to previous embodiments, the wind guard 200 may extend with a u-shaped structure with a barrier portion 208 and an engaging portion 210. The barrier portion 208 may extend vertically to block air flow between the gap and may include a rear barrier 212, a left barrier 214 and a right barrier 216. The engaging portion 210 may include components that extend generally perpendicular relative to various portions of the barrier portion 208. For example, the engaging portion 210 may include a rear extension 218, a left extension 220 and a right extension 222 such that the rear extension 218 extends substantially perpendicular relative to the rear barrier 212 and the left and right extensions 220, 222 extend substantially perpendicular relative to the respective left and right barriers 214, 216. Further, as in the previous embodiments, the left and right extensions 220, 222 may define openings 224 therein, the openings 224 positioned, sized and configured to receive griddle legs 226 of the griddle 204. Further, the rear extension 218 may define a notch 228 sized and configured to correspond with a grease cup 230 of the cooking system 206. As depicted in FIG. 14, the wind guard 200 may be positioned between the griddle 204 and the cooking station 202 so that the griddle legs 226 may extend through the openings 224 defined in the wind guard 200 and such that the griddle legs 226 may also extend through holes 232 defined along a ledge 234 of the cooking station 202, similar to the previous embodiments depicted in FIGS. 1 and 7. In this manner, the wind guard 200 may be interconnected to the griddle 204 and positioned to block air flow through the gap between the griddle 204 and the cooking station 202.

In one embodiment, in the use position, the u-shaped structure of the wind guard 200 may include both the barrier portion 208 and the engaging portion 210. In another embodiment, in the use position, the u-shaped structure may include at least the barrier portion 208 of the wind guard 200. In another embodiment, the u-shaped structure may include only the barrier portion 208 of the wind guard 200.

Figure 15:
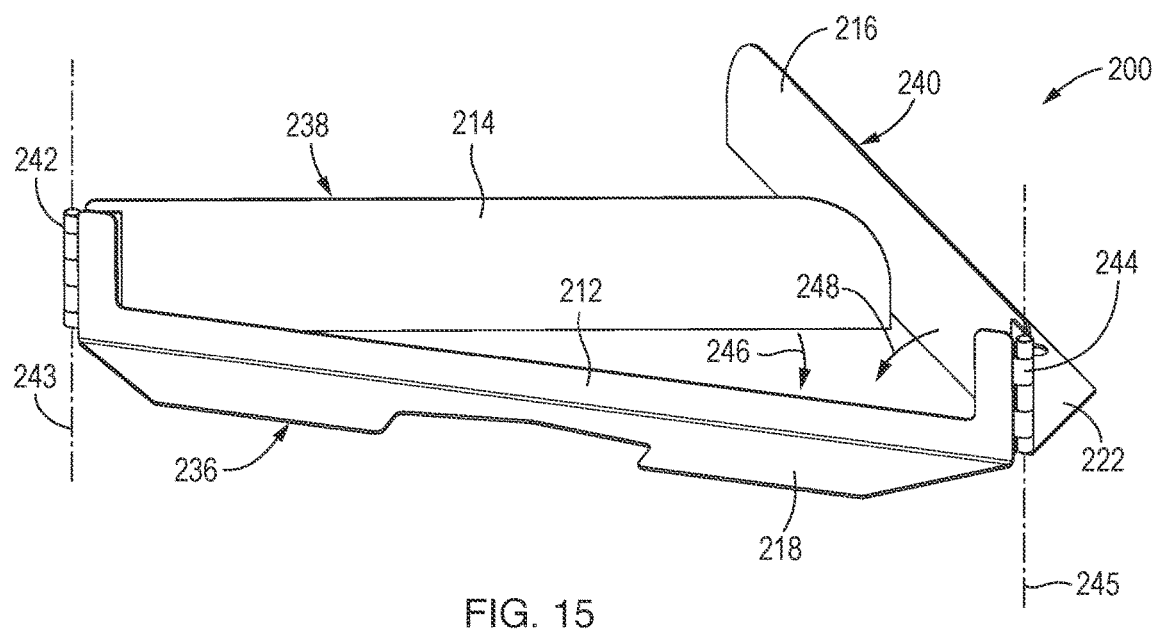
FIG. 15 is a perspective view of the wind guard, depicting portions of the wind guard in a partially folded position, according to another embodiment of the present invention.
Figure 16:
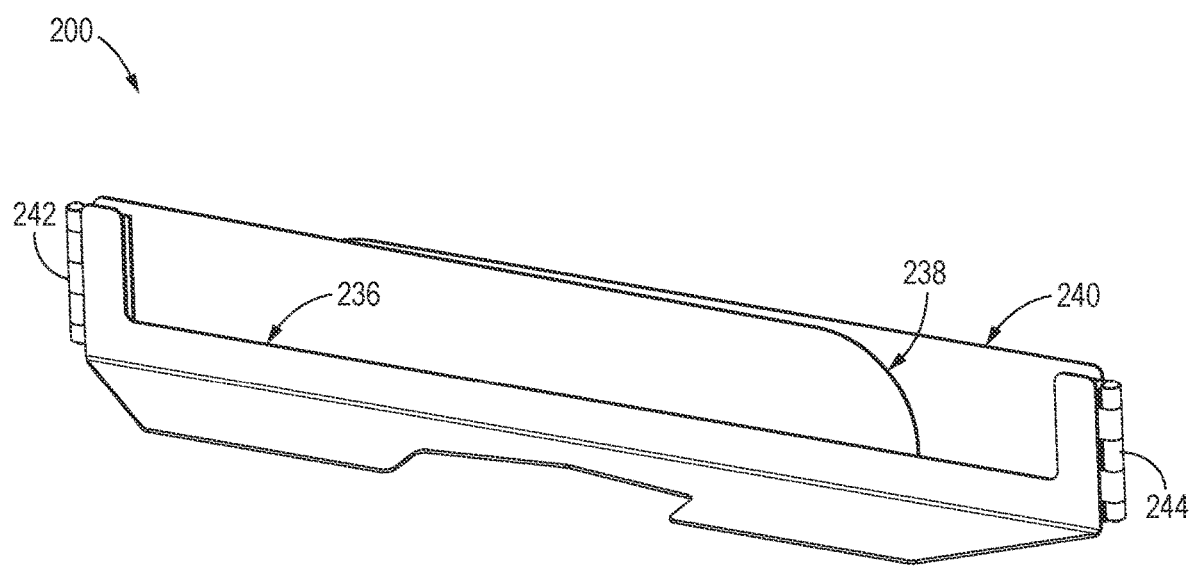
FIG. 16 is a perspective view of the wind guard, depicting the wind guard in a fully folded position, according to another embodiment of the present invention.

With respect to FIGS. 13, 15 and 16, as previously set forth, the wind guard 200 of this embodiment may be moved from the use position to a folded storage position. As depicted in FIG. 13, the wind guard 200 may extend with a u-shaped structure so as to exhibit a rear portion 236 and a left arm 238 and a right arm 240. The rear portion 236 may include both the rear barrier 212 and the rear extension 218. The left arm 238 may include both the left barrier 214 and the left extension 220, and the right arm 240 may include both the right barrier 216 and the right extension 222. In this embodiment, the left arm 238 may be pivotably coupled to one end of the rear portion 236 and, more specifically, pivotably coupled to the rear barrier 212 via a left hinge 242. Similarly, the right arm 240 may be pivotably coupled to another end of the rear portion 236 and, more specifically, the pivotably coupled to the rear barrier 212 via a right hinge 244. The left hinge and the right hinge define a left hinge axis 243 and a right hinge axis 245, respectively. As depicted in FIGS. 13 and 15, the left and right arms 238, 240 may be rotated or pivoted about the left and right hinges 242, 244 so as to rotate about the respective left and right hinge axes 243, 245 as shown by the respective left and right rotation arrows 246, 248. FIG. 15 depicts the left and right arms 238, 240 partially rotated toward the folded storage position. In this manner, the left and right arms 238, 240 may continue to be rotated toward a rear side of the rear portion 236 so that the wind guard 200 may be moved to the fully folded position or the folded storage position, as depicted in FIG. 16. As such, the left and right arms 238, 240 may be pivotably rotated about the left and right hinges 242, 244 so that they each may be rotated about 270 degrees from the use position to the folded storage position.

Figure 17:
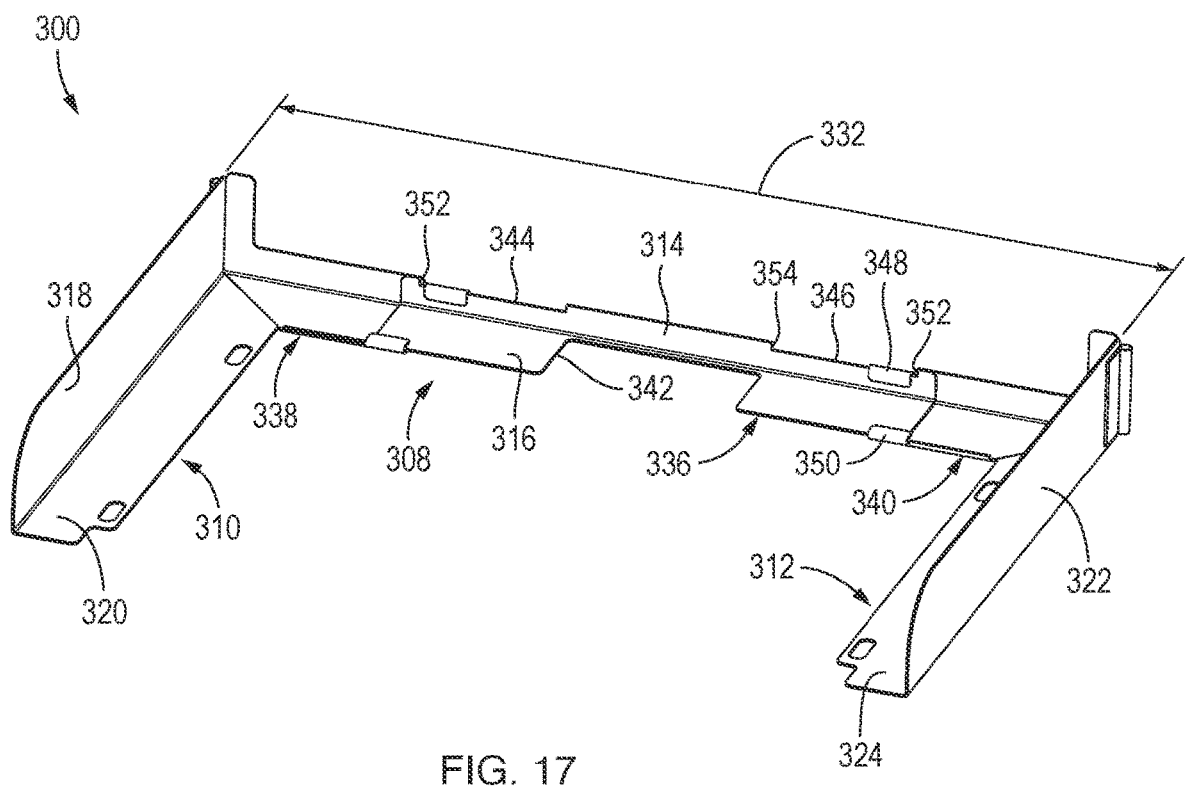
FIG. 17 is a top perspective view of another embodiment of a wind guard, depicting the wind guard having an adjustment portion in an expanded position, according to another embodiment of the present invention.
Figure 18:
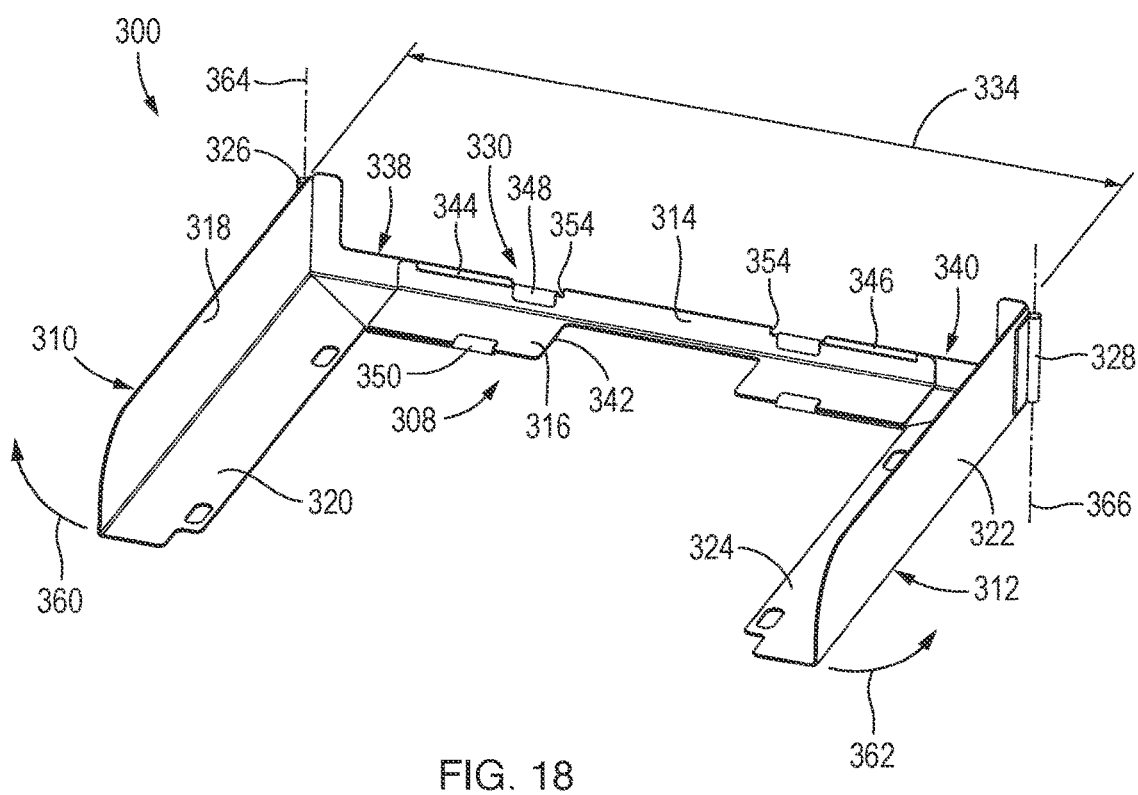
FIG. 18 is a top perspective view of the wind guard of FIG. 17, depicting the adjustment portion of the wind guard in a contracted position, according to another embodiment of the present invention.
Figure 19:
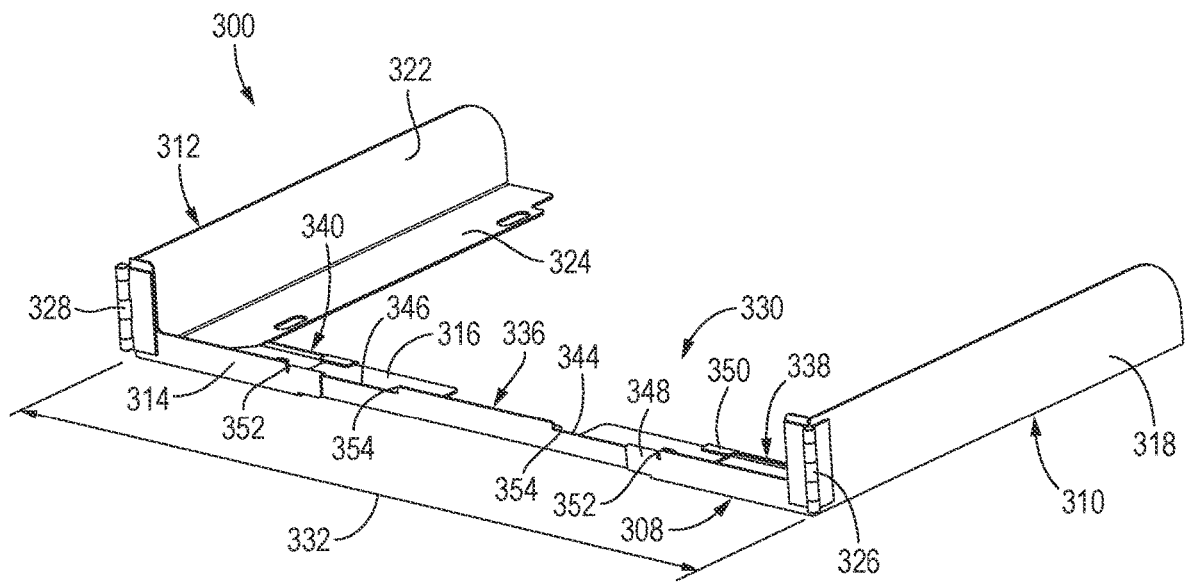
FIG. 19 is a rear perspective view of the wind guard, depicting the adjustment portion in the expanded position, according to another embodiment of the present invention.
Figure 21:
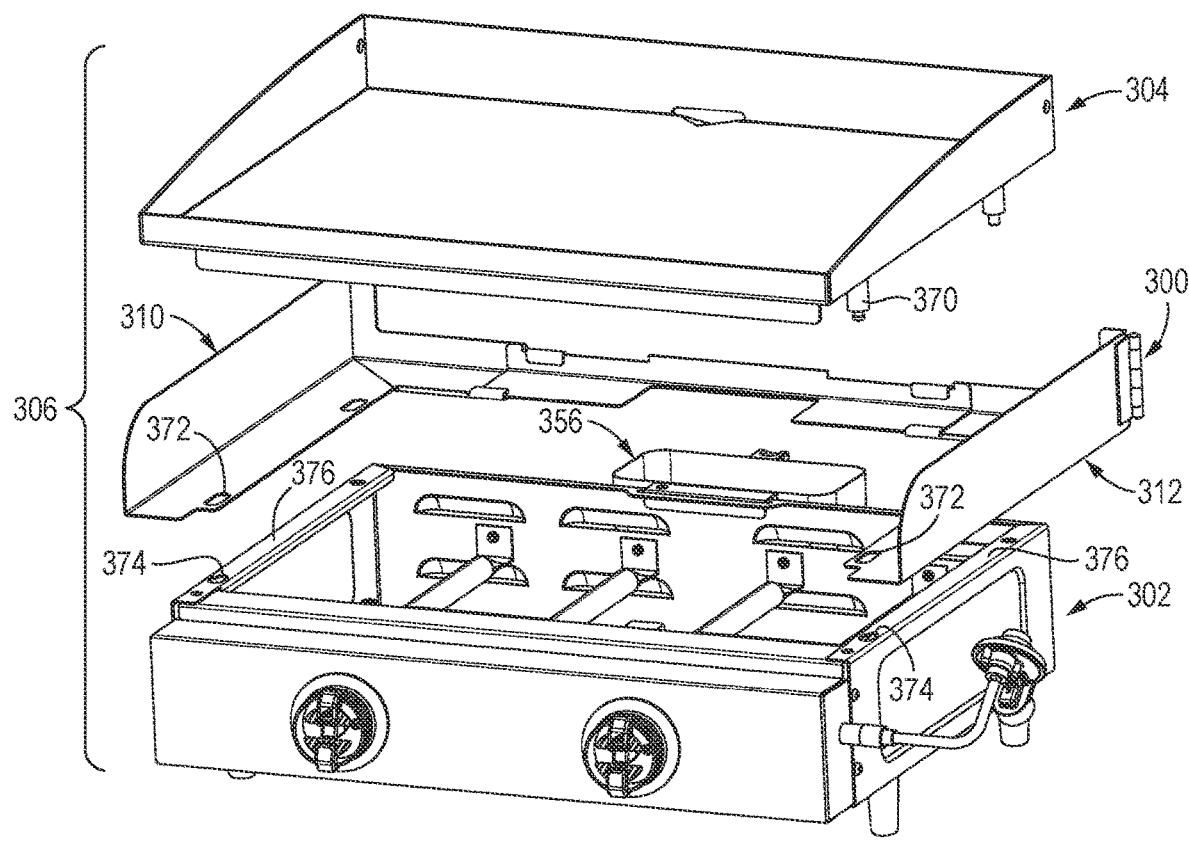
FIG. 21 is an exploded position of a cooking system with the wind guard in the expanded position, depicting the wind guard positioned between a griddle and a cooking station, according to another embodiment of the present invention.

Now with reference to FIGS. 17, 18 and 19, another embodiment of a wind guard 300 is provided. Similar to previous embodiments, the wind guard 300 may be sized and configured to substantially block air flow moving through a gap between a cooking station 302 and griddle 304 such that the wind guard 300, the cooking station 302 and the griddle 304 are components of a cooking system 306 (see also, FIG. 21). Similar to the previous embodiment, the wind guard 300 may include a rear portion 308 with left and right arms 310, 312 pivotably coupled to opposite ends of the rear portion 308. Further, similar to the previous embodiment, the rear portion 308 may include a rear barrier 314 and a rear extension 316 and, further, the left and right arms 310, 312 may include left and right barriers 318, 322 as well as left and right extensions 320, 324, respectively. Further, the wind guard 300 may include left and right hinges 326, 328 sized and configured to facilitate rotating the left and right arms 310, 312 relative to the rear portion 308 to pivotably rotate the left and right arms 310, 312 to a rear side of the rear portion 308 to, thereby, move the wind guard 300 from a use position (see FIGS. 17 and 18) to a folded storage position (see FIG. 19), similar to the previous embodiment.

In another embodiment, the rear portion 308 of the wind guard 300 may include an adjustment portion 330 sized and configured to change an effective length of the rear portion 308. Such changing of the effective length of the rear portion 308 may facilitate employing the wind guard 300 with multiple different sized cooking stations, the cooking stations being similar in depth but having different widths or lengths to accommodate different sized griddles. For example, the effective length of the rear portion 308 may extend between a first length 332 and a second length 334, the first length 332 being larger than the second length 334. In this manner, the adjustment portion 330 may be longitudinally adjustable so as to adjust the effective length of the rear portion 308 between the first length 332 and the second length 334.

The adjustment portion 330 of the rear portion 308 of the wind guard 300 may be defined by an intermediate member 336 slidably positioned between a left member 338 and a right member 340. The intermediate member 336 may define a notch 342 that may be centrally located therein that may be sized and configured to be positioned adjacent a grease cup 356 (FIG. 21), similar to previous embodiments. The intermediate member 336 may also include a left notch 344 and a right notch 346 each defined in the rear barrier 314 of the rear portion 308. Further, the intermediate member 336 may be slidably coupled to the left and right members 338, 340 via an upper tab 348 and a lower tab 350 of each of the respective left and right members 338, 340. For example, each of the upper and lower tabs 348, 350 may extend to define a channel (not shown) sized and configured to hold a portion of the intermediate member 336 therein such that the intermediate member 336 may be slideable through the channels defined in the upper and lower tabs 348, 350. Further, each of the left and right notches 344, 346 may extend between outer and inner abutments 352, 354 such that the outer and inner abutments 352, 354 engage with the upper tabs 348 of the respective left and right members 338, 340. Such outer and inner abutments 352, 354 may facilitate a stopping point of the upper tabs 348 within the respective left and right notches 344, 346. In this manner, the left and right members 338, 340 may be slidable relative to the intermediate member 336 to change the effective length of the rear portion 308 of the wind guard 300. For example, as depicted in FIGS. 17 and 19, the rear portion 308 of the wind guard 300 may be elongated to be positioned with the first length 332 such that the upper tabs 348 of the left and right members 338, 340 may be positioned against the outer abutments 352 of the left and right notches 344, 346 of the intermediate member 336. Further, as set forth, the rear portion 308 of the wind guard 300 may be adjusted, compacted or minimized to the second length 334 such that the upper tabs 348 of the left and right members 338, 340 may be positioned against the inner abutments 354 of the left and right notches 344, 346 of the intermediate member 336. At the second length 334, the rear portion 308 of the wind guard 300 may be an effectively shorter length than the first length 332 of the rear portion 308. Further, with the rear portion 308 of the wind guard 300 being positioned at the second length 334, the wind guard 300 may be positioned on a smaller sized cooking station to correspond with a smaller sized griddle than the cooking station and griddle sized to correspond with the wind guard 300 with the rear portion positioned at the first length 332.

Figure 20:
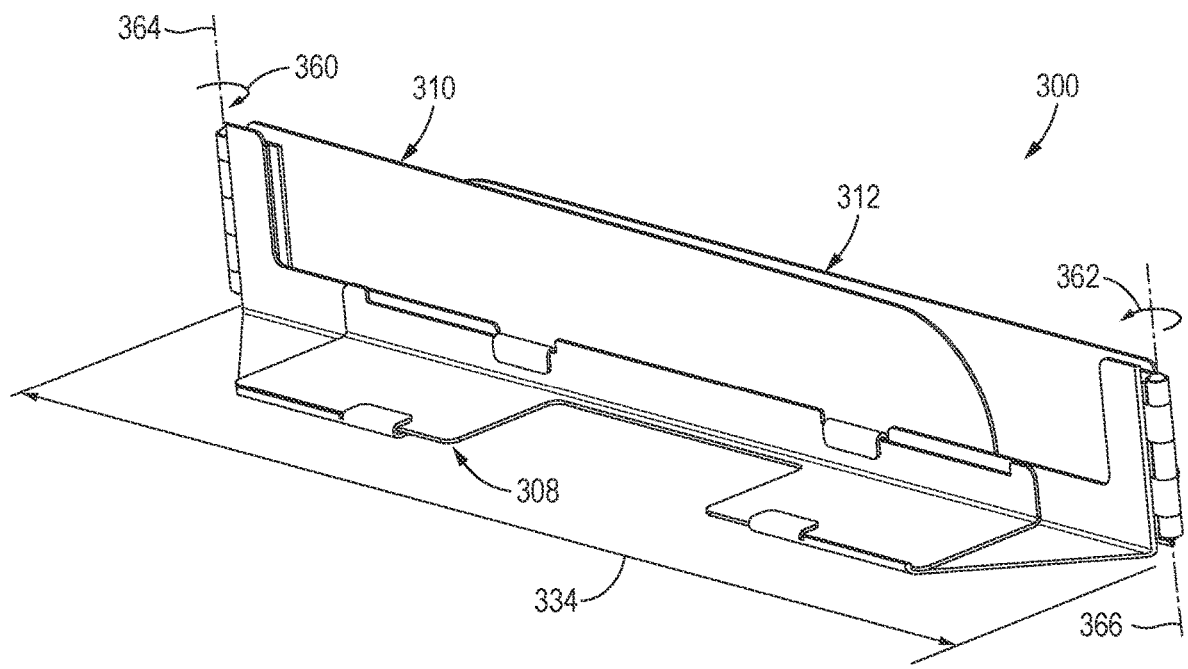
FIG. 20 is a perspective view of the wind guard, depicting the wind guard in a fully folded position, according to another embodiment of the present invention.

With reference to FIGS. 18 and 20, similar to the previous embodiment, the left and right arms 310, 312 of the wind guard 300 may rotatably pivot rearward, as shown by respective first and second rotational arrows 360, 362, so as to rotate about respective first and second hinge axes 364, 366. Such rearward pivoting, relative to the rear portion 308, may facilitate the wind guard 300 to be moved from a use position (FIG. 18) to a folded storage position (FIG. 20). Further, such wind guard 300 may be moved to the folded storage position with the rear portion 308 of the wind guard 300 in the expanded or elongated position having the first length 332 (FIG. 17) or with the rear portion 308 of the wind guard 300 in the contracted or minimized position having the second length 334. In this manner, the wind guard 300 may be adjustable in size to be positioned on multiple sized cooking stations as well as the wind guard 300 being compactable from the use position to the folded storage position. For example, with respect to FIG. 21, similar to the previous embodiments set forth herein, the wind guard 300 of this embodiment may be positioned between the cooking station 302 and the griddle 304. The wind guard 300 may be interconnected and coupled to the griddle 304 with griddle legs 370 of the griddle 304 being positioned through openings 372 defined in the left and right arms 310, 312 of the wind guard 300 so that the griddle legs 370 also extend and rest in holes 374 defined in the ledge 376 of the cooking station 3002, similar to that shown in FIGS. 1 and 7 of previous embodiments described herein.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A cooking system configured to minimize cross-winds while cooking a food product, the cooking system comprising:
   a cooking station having a main body extending from an upper side toward a lower side to define a front side, a rear side, a left side and a right side, the cooking station having one or more flame burners supported by the main body;
   a griddle extending to define a cooking surface and an oppositely facing underside surface, the underside surface including griddle legs extending therefrom, the underside surface extending to define a front periphery, a rear periphery, a left periphery and a right periphery, the front periphery extending parallel relative to the rear periphery, the left periphery extending parallel relative to the right periphery; and
   a wind guard extending to define a barrier portion and an engaging portion, the engaging portion being coupled to at least two of the griddle legs such that, upon the griddle being positioned over the main body and the one or more flame burners, the barrier portion of the wind guard extends to at least partially block a gap between the underside surface of the griddle and the upper side of the main body.

2. The cooking system of claim 1, wherein the wind guard extends with a u-shaped configuration such that the barrier portion is configured to at least partially block the gap along the rear periphery of the griddle and extends to at least partially block the gap along the left and right peripheries of the griddle.

3. The cooking system of claim 1, wherein the barrier portion includes a rear barrier, a left barrier, and a right barrier, the left and right barriers extending from opposing ends of the rear barrier.

4. The cooking system of claim 3, wherein the left and right barriers are fixedly coupled to the opposing ends of the rear barrier.

5. The cooking system of claim 3, wherein the engaging portion extends inward relative to the left and right barriers to define left and right extensions, respectively.

6. The cooking system of claim 1, wherein the engaging portion comprises holes defined therein, the holes sized and configured to receive at least two of the griddle legs therein to couple the engaging portion to the griddle.

7. The cooking system of claim 6, wherein at least two of the griddle legs are configured to be positioned through the holes of the engaging portion and through recesses defined in the upper side of the main body.

8. The cooking system of claim 6, wherein the upper side of the main body comprises a ledge along at least the left and right sides of the main body, the ledge including at least two recesses defined therein such that the at least two recesses are sized and configured to receive the at least two of the griddle legs of the griddle.

9. The cooking system of claim 1, wherein the griddle legs comprise a leg base and a leg end portion, the leg base defining a height that corresponds with the gap.

10. The cooking system of claim 3, wherein the left and right barriers are pivotably coupled to the rear barrier such that the left and right barriers are configured to pivotably rotate so that the wind guard is moveable from a use position to a storage position.

11. The cooking system of claim 3, wherein the rear barrier comprises an adjustment portion such that the rear barrier is longitudinally adjustable to move between a first length and a second length.

12. A wind guard for blocking a cross-wind while cooking a food product on a griddle with griddle legs positioned on a cooking station such that a gap is defined between an upper side of the cooking station and an underside of the griddle, the wind guard comprising:
   a barrier portion and an engaging portion, the engaging portion configured to be coupled to at least two of the griddle legs such that, upon the griddle being positioned on the upper side of the cooking station, the engaging portion is configured to be positioned over the upper side of the cooking station so that the barrier portion extends vertically from the engaging portion to at least partially block the gap between an underside surface of the griddle and the upper side of the cooking station so that the barrier portion is configured to extend along a rear periphery of the griddle and extend along left and right peripheries of the griddle;
   wherein the barrier portion includes a rear barrier, a left barrier, and a right barrier, the left and right barriers extending from opposing ends of the rear barrier.

13. The wind guard of claim 12, wherein the left and right barriers are fixedly coupled to the opposing ends of the rear barrier.

14. The wind guard of claim 12, wherein the left and right barriers are pivotably coupled relative to the rear barrier such that the left and right barriers are configured to pivotably rotate so that the wind guard is moveable from a use position to a storage position.

15. The wind guard of claim 12, wherein the rear barrier comprises an adjustment portion such that the rear barrier is longitudinally adjustable to move between a first length and a second length.

16. A method for substantially blocking wind between a gap of a griddle cooking station, the method comprising:
   providing a griddle with griddle legs configured to be positioned on an upper side of a cooking station such that the gap is defined between an underside of the griddle and the upper side of the cooking station; and
   coupling an engaging portion of a wind guard to at least two of the griddle legs such that, upon the griddle being positioned on the upper side of the cooking station, a barrier portion of the wind guard extends vertically from the engaging portion to at least partially block the gap between the underside surface of the griddle and the upper side of the cooking station along a rear periphery of the griddle and along left and right peripheries of the griddle.

17. The method according to claim 16, further comprising removing the wind guard from the griddle legs of the griddle such that the barrier portion includes at least a rear barrier, a left barrier and a right barrier, the left and right barriers being fixedly coupled to opposing ends of the rear barrier.

18. The method according to claim 16, further comprising removing the wind guard from the griddle legs of the griddle such that the barrier portion includes at least a rear barrier, a left barrier and a right barrier, the left and right barriers being pivotably coupled to the rear barrier such that the left and right barriers are configured to pivotably rotate so that the wind guard is moveable from a use position to a storage position.

19. The method according to claim 16, further comprising removing the wind guard from the griddle legs of the griddle such that the barrier portion includes at least a rear barrier, a left barrier and a right barrier, the left and right barriers being coupled to opposing ends of the rear barrier, the rear barrier having an adjustment portion such that the rear barrier is longitudinally adjustable to move the rear barrier to extend between a first length and a second length.

\* \* \* \* \*